(12) United States Patent
Sasaki et al.

(10) Patent No.: US 7,468,863 B2
(45) Date of Patent: Dec. 23, 2008

(54) THIN-FILM MAGNETIC HEAD STRUCTURE ADAPTED TO MANUFACTURE A THIN-FILM HEAD HAVING A BASE MAGNETIC POLE PART, A YOKE MAGNETIC POLE PART, AND AN INTERVENING INSULATIVE FILM

(75) Inventors: Yoshitaka Sasaki, Santa Clara, CA (US); Hiroyuki Ito, Sunnyvale, CA (US); Kazuo Ishizaki, Milpitas, CA (US); Takehiro Horinaka, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 560 days.

(21) Appl. No.: 11/172,984

(22) Filed: Jul. 5, 2005

(65) Prior Publication Data

US 2007/0008649 A1  Jan. 11, 2007

(51) Int. Cl.
G11B 5/147 (2006.01)
(52) U.S. Cl. .............................. 360/125.09; 360/125.13
(58) Field of Classification Search ............ 360/125.08, 360/125.09, 125.12, 125.13, 125.1, 125.11, 360/125.14, 125.15, 125.01
See application file for complete search history.

(56) References Cited

U.S. PATENT DOCUMENTS

| 4,656,546 A | 4/1987 | Mallory |
| 4,672,493 A | 6/1987 | Schewe |
| 4,763,215 A * | 8/1988 | Gueugnon et al. ..... 360/125.13 |
| 6,504,675 B1 | 1/2003 | Shukh et al. |
| 6,683,748 B2 * | 1/2004 | Kim et al. ............... 360/125.13 |
| 6,710,973 B2 * | 3/2004 | Okada et al. ........... 360/125.13 |
| 6,903,900 B2 * | 6/2005 | Sato et al. .............. 360/125.12 |
| 6,950,277 B1 * | 9/2005 | Nguy et al. ............ 360/125.14 |
| 6,952,325 B2 * | 10/2005 | Sato et al. .............. 360/125.08 |
| 7,227,720 B2 * | 6/2007 | Sasaki et al. ........... 360/125.12 |
| 7,296,339 B1 * | 11/2007 | Yang et al. ............... 29/603.16 |

(Continued)

FOREIGN PATENT DOCUMENTS

JP  2003-203311  7/2003

(Continued)

*Primary Examiner*—Brian E Miller
(74) *Attorney, Agent, or Firm*—Oliff & Berridge, PLC

(57) ABSTRACT

A thin-film magnetic head structure has a configuration adapted to manufacture a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated. The main magnetic pole layer includes a base magnetic pole part comprising the magnetic pole end part and a base depression distanced farther from the medium-opposing surface than the magnetic pole end part, and an embedded magnetic pole part buried in the base depression and joined to the base magnetic pole part. The thin-film magnetic head structure includes a yoke magnetic pole part joined to the base magnetic pole part and embedded magnetic pole part at a position distanced farther from the medium-opposing surface than the recording gap layer, and an intervening insulative film disposed between the embedded magnetic pole part and yoke magnetic pole part at a position distanced farther from the medium-opposing surface than the recording gap layer.

16 Claims, 29 Drawing Sheets

U.S. PATENT DOCUMENTS

| | | | |
|---|---|---|---|
| 7,333,296 B2 * | 2/2008 | Sasaki et al. | 360/125.03 |
| 7,417,825 B2 * | 8/2008 | Sasaki et al. | 360/125.07 |
| 2004/0240110 A1 * | 12/2004 | Matono | 360/126 |
| 2005/0117251 A1 * | 6/2005 | Matono et al. | 360/126 |
| 2005/0280936 A1 * | 12/2005 | Sasaki et al. | 360/126 |
| 2006/0002025 A1 * | 1/2006 | Takahashi et al. | 360/126 |
| 2006/0198049 A1 * | 9/2006 | Sasaki et al. | 360/126 |
| 2006/0221499 A1 * | 10/2006 | Tagami et al. | 360/126 |

FOREIGN PATENT DOCUMENTS

| | | |
|---|---|---|
| JP | 2003-242607 | 8/2003 |
| JP | 2004-094997 | 3/2004 |

* cited by examiner

Fig.4
(A)
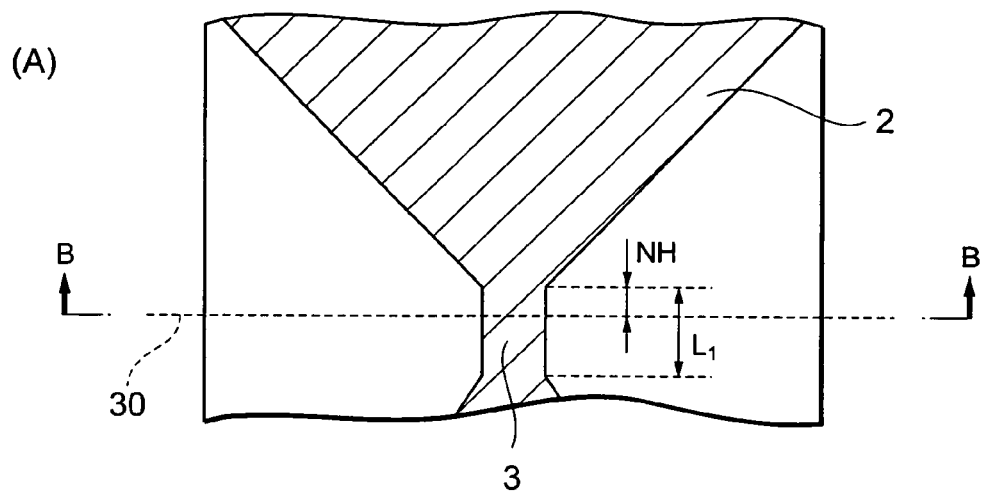
(B)
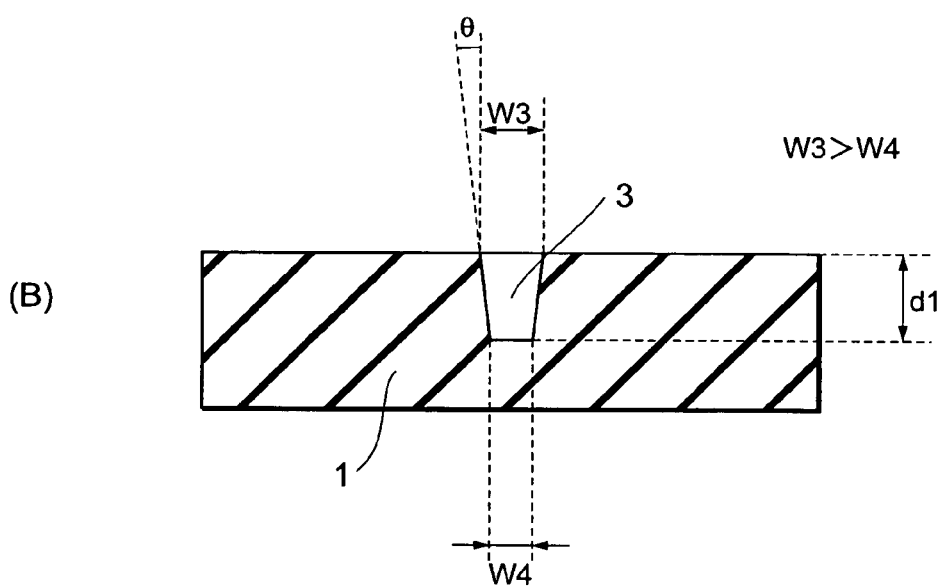
W3 > W4

Fig.5
(A)
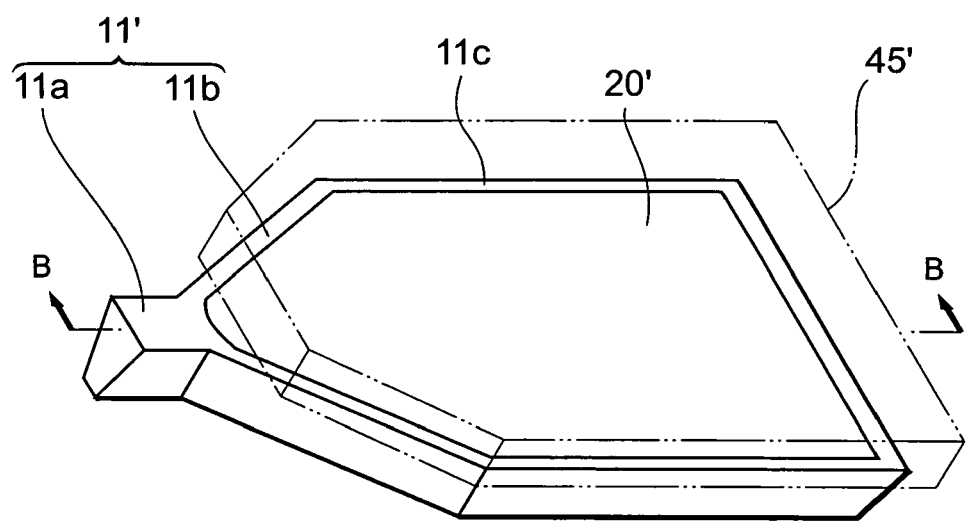
(B)
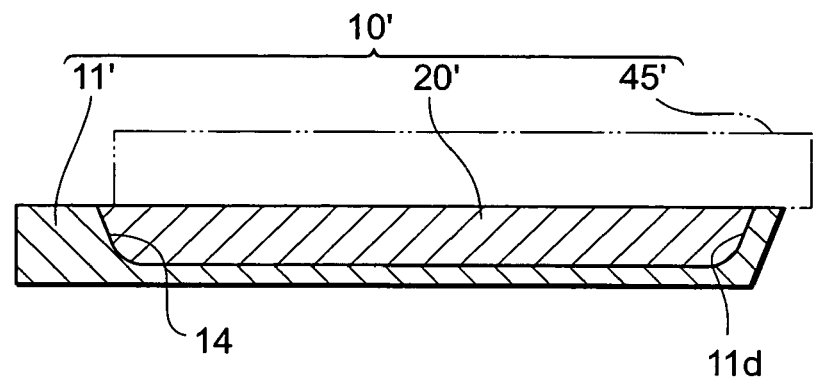

THIN-FILM MAGNETIC HEAD STRUCTURE ADAPTED TO MANUFACTURE A THIN-FILM HEAD HAVING A BASE MAGNETIC POLE PART, A YOKE MAGNETIC POLE PART, AND AN INTERVENING INSULATIVE FILM

TECHNICAL FIELD

The present invention relates to a thin-film magnetic head structure for manufacturing a thin-film magnetic head which performs magnetic recording operations by perpendicular recording, a method of manufacturing the same, and a thin-film magnetic head.

BACKGROUND OF THE INVENTION

In recent years, the areal density in hard disk drives has been increasing remarkably. Recently, the areal density in hard disk drives has reached 160 to 200 GB/platter in particular, and is about to increase further. Accordingly, thin-film magnetic heads have been required to improve their performances.

In terms of recording schemes, thin-film magnetic heads can roughly be divided into those for longitudinal recording in which information is recorded in a (longitudinal) direction of a recording surface of a hard disk (recording medium) and those for perpendicular recording in which data is recorded while the direction of recording magnetization formed in the hard disk is perpendicular to the recording surface. As compared with the thin-film magnetic heads for longitudinal recording, the thin-film magnetic heads for perpendicular recording have been considered more hopeful, since they can realize a much higher recording density while their recorded hard disks are less susceptible to thermal fluctuations.

Conventional thin-film magnetic heads for perpendicular recording are disclosed, for example, in U.S. Pat. No. 6,504,675, U.S. Pat. No. 4,656,546, U.S. Pat. No. 4,672,493, and Japanese Patent Application Laid-Open No. 2004-94997.

Meanwhile, when thin-film magnetic heads for perpendicular recording record data onto areas in inner and outer peripheries of a hard disk, a magnetic pole end part disposed on the side of a medium-opposing surface (also referred to as air bearing surface, ABS) opposing the recording medium (hard disk) yields a certain skew angle with respect to a data recording track. In perpendicular magnetic recording heads (hereinafter also referred to as "PMR") having a high writing capability, the skew angle has caused a problem of so-called side fringe in which unnecessary data are recorded between adjacent tracks. The side fringe adversely affects the detection of servo signals and the S/N ratio of reproduced waveforms. Therefore, in conventional PMRs, the magnetic pole end part on the ABS side in the main magnetic pole layer has a bevel form gradually narrowing in width toward one direction (see, for example, Japanese Patent Application Laid-Open Nos. 2003-242067 and 2003-203311 in this regard).

OBJECT AND SUMMARY OF THE INVENTION

However, the conventional PMRs have been problematic in that they cause a phenomenon known as pole erasure by which data recorded beforehand on a hard disk is erased when information is further recorded at a high density. The pole erasure is a phenomenon in which, after data is written on a recording medium (hard disk) having a high maximum coercivity Hc, a leakage magnetic flux flows from the ABS to the hard disk even when no write current flows through a thin-film coil, thereby erasing the other data.

This point will be explained in further detail.

An example of the conventional PMRs is a thin-film magnetic head 400 having a structure shown in FIGS. 29(A), (B), and (C). This thin-film magnetic head 400 includes a main magnetic pole layer 402 which is formed on an insulating layer 401 and has a bevel-shaped magnetic pole end part disposed on the side of an ABS 403; a write shield layer 405 which is magnetically connected to the main magnetic pole layer 402 and opposes the main magnetic pole layer 402 by way of a recording gap layer 404 on the ABS 403 side; and a thin-film coil 406. The thin-film coil 406 is wound in a planar spiral about a junction 408 connecting the main magnetic pole layer 402 and the write shield layer 405, while its windings are insulated from each other by a photoresist 407.

In the conventional PMRs, as in the thin-film magnetic head 400, a magnetic material is magnetized such that the direction of magnetization ms is oriented so as to extend along the ABS 403, whereby the main magnetic pole layer 402 is formed.

In the conventional PMRs such as the thin-film magnetic head 400, however, even when the direction of magnetization ms is oriented so as to extend along the ABS 403, the direction of remnant magnetization mr inside the main magnetic pole layer 402 after completion of writing is oriented toward the ABS 403 side and thus faces a different direction than the magnetization ms. (The direction different from that extending along the ABS will be referred to as "different direction" in the following.) Therefore, when such a PMR writes data, leakage magnetic fluxes due to the remnant magnetization mr may erase data already written on a hard disk or weaken signals of written data even though no write current is flowing.

In order to overcome the problem mentioned above, it is an object of the present invention to provide a thin-film magnetic head structure which can manufacture a thin-film magnetic head comprising a structure capable of preventing the pole erasure from occurring while improving the recording density, a method of manufacturing the same, and a thin-film magnetic head.

For solving the above-mentioned problem, in one aspect, the present invention provides a thin-film magnetic head structure adapted to manufacture a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; wherein the main magnetic pole layer includes a base magnetic pole part comprising the magnetic pole end part and a base depression distanced farther from the medium-opposing surface than the magnetic pole end part, and an embedded magnetic pole part buried in the base depression and joined to the base magnetic pole part; and wherein the thin-film magnetic head structure includes a yoke magnetic pole part joined to the base magnetic pole part and embedded magnetic pole part at a position distanced farther from the medium-opposing surface than the recording gap layer, and an intervening insulative film disposed between the embedded magnetic pole part and yoke magnetic pole part at a position distanced farther from the medium-opposing surface than the recording gap layer.

In this thin-film magnetic head structure, the joint between the base magnetic pole part having the magnetic pole end part and the embedded magnetic pole part blocks the emission of remnant magnetization from the embedded magnetic pole part to the magnetic pole end part. Since the embedded magnetic pole part and the yoke magnetic pole part are joined to each other by way of the intervening insulative film, the quantity of magnetism increases, so as to improve the overwrite characteristic, whereas the intervening insulative film can block the emission of remnant magnetization from the yoke magnetic pole part.

The thin-film magnetic head structure may further comprise a base insulating layer including a magnetic pole forming depression sunken into a form corresponding to the main magnetic pole layer, the magnetic pole forming depression having a very narrow groove part formed so as to define a track width of the thin-film magnetic head, whereas the base magnetic pole part is arranged at the magnetic pole forming depression in the base insulating layer.

In this case, the main magnetic pole layer is formed so as to be embedded in the magnetic pole forming depression.

In the thin-film magnetic head structure, the base magnetic pole part and the embedded magnetic pole part may be joined to each other at a first contact area disposed between the medium-opposing surface and the thin-film coil, and at a second contact area disposed at a position distanced farther from the medium-opposing surface than the thin-film coil.

In this case, the base magnetic pole part and the embedded magnetic pole are joined to each other in the vicinity of the medium-opposing surface.

In the thin-film magnetic head structure, the saturated magnetic flux density of the base magnetic pole part may be set higher than the saturated magnetic flux density of the embedded magnetic pole part.

This can prevent the overwrite characteristic from deteriorating along with the saturation with the magnetic flux.

In another aspect, the present invention provides a thin-film magnetic head structure adapted to manufacture a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; wherein the main magnetic pole layer includes a base magnetic pole part comprising the magnetic pole end part and a base depression distanced farther from the medium-opposing surface than the magnetic pole end part, an embedded magnetic pole part buried in the base depression and joined to the base magnetic pole part, and a stepped part with a variable thickness at a position distanced farther from the medium-opposing surface than the recording gap layer, the thickness at a position distanced farther from the medium-opposing surface than the stepped part being formed greater than the thickness at a position closer to the medium-opposing surface than the stepped part; and wherein the thin-film magnetic head structure includes a yoke magnetic pole part joined to the base magnetic pole part and embedded magnetic pole part at a position distanced farther from the medium-opposing surface than the recording gap layer.

As the thickness is greater at a position distanced farther from the medium-opposing surface than the stepped part, this thin-film magnetic head structure increases the quantity of magnetism and improves the overwrite characteristic.

The thin-film magnetic head structure may further comprise a base insulating layer including a magnetic pole forming depression sunken into a form corresponding to the main magnetic pole layer, the magnetic pole forming depression having a very narrow groove part formed so as to define a track width of the thin-film magnetic head, whereas the base magnetic pole part is arranged at the magnetic pole forming depression in the base insulating layer.

In this case, the main magnetic pole layer is formed so as to be embedded in the magnetic pole forming depression.

The main magnetic pole layer in the thin-film magnetic head structure may have an expanded area with a width expanded along the medium-opposing surface.

As the expanded area having the width expanded along the medium-opposing surface is provided, the quantity of magnetism increases, thereby improving the overwrite characteristic.

The magnetic pole forming depression in the thin-film magnetic head structure may have a variable depth structure whose depth changes at a stepped line disposed at a position distanced farther from the medium-opposing surface than the recording gap layer.

This forms areas with different thicknesses in the main magnetic pole layer formed as being embedded in the magnetic pole forming depression.

In still another aspect, the present invention provides a method of manufacturing a thin-film magnetic head structure adapted to manufacture a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; the method comprising the steps of:

(1) forming a base insulating layer including a magnetic pole forming depression sunken into a form corresponding to the main magnetic pole layer, the magnetic pole forming depression having a very narrow groove part formed so as to define a track width of the thin-film magnetic head;

(2) forming a film-like magnetic pole part at an inner periphery in an area other than the very narrow groove part in the magnetic pole forming depression by a first magnetic material while embedding the first magnetic material into the very narrow groove part formed in the base insulating layer;

(3) embedding a second magnetic material different from the first magnetic material into the inside of the film-like magnetic pole part;

(4) surface-flattening the first magnetic material and second magnetic material on a side closer to the thin-film coil, so as to cause the first magnetic material embedded in the very narrow groove part to form the magnetic pole end part, and cause a base magnetic pole part constituted by the magnetic pole end part and film-like magnetic pole part and the second magnetic material embedded in the inside of the film-like magnetic pole part to form the main magnetic pole layer having an embedded junction structure;

(5) forming the surface-flattened base magnetic pole part and embedded magnetic pole part with the recording gap layer and an intervening insulative film disposed at a position distanced farther from the medium-opposing surface than the recording gap layer;

(6) forming a yoke magnetic pole part joined to the base magnetic pole part and embedded magnetic pole part at a part where no intervening insulative film exists;

(7) forming the thin-film coil such that the thin-film coil comes into contact with the yoke magnetic pole part by way of an insulating film; and (8) forming the write shield layer such that the write shield layer faces the magnetic pole end part by way of the recording gap layer.

In this manufacturing method, a magnetic material having a saturated magnetic flux density lower than that of the first magnetic material may be used as the second magnetic material.

In still another aspect, the present invention provides a method of manufacturing a thin-film magnetic head structure adapted to manufacture a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; the method comprising the steps of:

(1) forming a base insulating layer including a magnetic pole forming depression sunken into a form corresponding to the main magnetic pole layer, the magnetic pole forming depression having a very narrow groove part formed so as to define a track width of the thin-film magnetic head and sunken into a form corresponding to the main magnetic pole layer with a depth changing at a stepped line disposed at a position distanced farther from the medium-opposing surface than the recording gap layer so as to become greater on the side distanced farther from the medium-opposing surface than the stepped line;

(2) forming a film-like magnetic pole part at an inner periphery in an area other than the very narrow groove part in the magnetic pole forming depression by a first magnetic material while embedding the first magnetic material into the very narrow groove part formed in the base insulating layer;

(3) embedding a second magnetic material different from the first magnetic material into the inside of the film-like magnetic pole part;

(4) surface-flattening the first magnetic material and second magnetic material on a side closer to the thin-film coil, so as to cause the first magnetic material embedded in the very narrow groove part to form the magnetic pole end part, and cause a base magnetic pole part constituted by the magnetic pole end part and film-like magnetic pole part and the second magnetic material embedded in the inside of the film-like magnetic pole part to form the main magnetic pole layer having an embedded junction structure;

(5) forming the surface-flattened base magnetic pole part and embedded magnetic pole part with the recording gap layer;

(6) forming a yoke magnetic pole part joined to the base magnetic pole part and embedded magnetic pole part;

(7) forming the thin-film coil such that the thin-film coil comes into contact with the yoke magnetic pole part by way of an insulating film; and (8) forming the write shield layer such that the write shield layer faces the magnetic pole end part by way of the recording gap layer.

The manufacturing method may further comprise the step of expanding a width of the magnetic pole forming depression along the stepped line.

In still another aspect, the present invention provides a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; wherein the main magnetic pole layer includes a base magnetic pole part comprising the magnetic pole end part and a base depression distanced farther from the medium-opposing surface than the magnetic pole end part, and an embedded magnetic pole part buried in the base depression and joined to the base magnetic pole part; and wherein the thin-film magnetic head includes a yoke magnetic pole part joined to the base magnetic pole part and embedded magnetic pole part at a position distanced farther from the medium-opposing surface than the recording gap layer, and an intervening insulative film disposed between the embedded magnetic pole part and yoke magnetic pole part at a position distanced farther from the medium-opposing surface than the recording gap layer.

In still another aspect, the present invention provides a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated; wherein the main magnetic pole layer includes a base magnetic pole part comprising the magnetic pole end part and a base depression distanced farther from the medium-opposing surface than the magnetic pole end part, an embedded magnetic pole part buried in the base depression and joined to the base magnetic pole part, and a stepped part with a variable thickness at a position distanced farther from the medium-opposing surface than the recording gap layer, the thickness at a position distanced farther from the medium-opposing surface than the stepped part being formed greater than the thickness at a position closer to the medium-opposing surface than the stepped part; and wherein the thin-film magnetic head includes a yoke magnetic pole part joined to the base magnetic pole part and embedded magnetic pole part at a position distanced farther from the medium-opposing surface than the recording gap layer.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 4 is a view showing a major part of FIG. 3 under magnification with changed ratios of dimensions, in which (A) is a plan view, and (B) is a sectional view taken along the line B-B of (A);

FIG. 5 is a view showing the main magnetic pole layer and upper yoke magnetic pole part after being cut along the ABS, in which (A) is a perspective view, and (B) is a sectional view taken along the line B-B of (A);

DESCRIPTION OF THE PREFERRED EMBODIMENTS

In the following, embodiments of the present invention will be explained with reference to the drawings. Constituents identical to each other will be referred to with numerals identical to each other without repeating their overlapping descriptions.

First Embodiment

Configuration of Thin-Film Magnetic Head Structure

Figure 1:
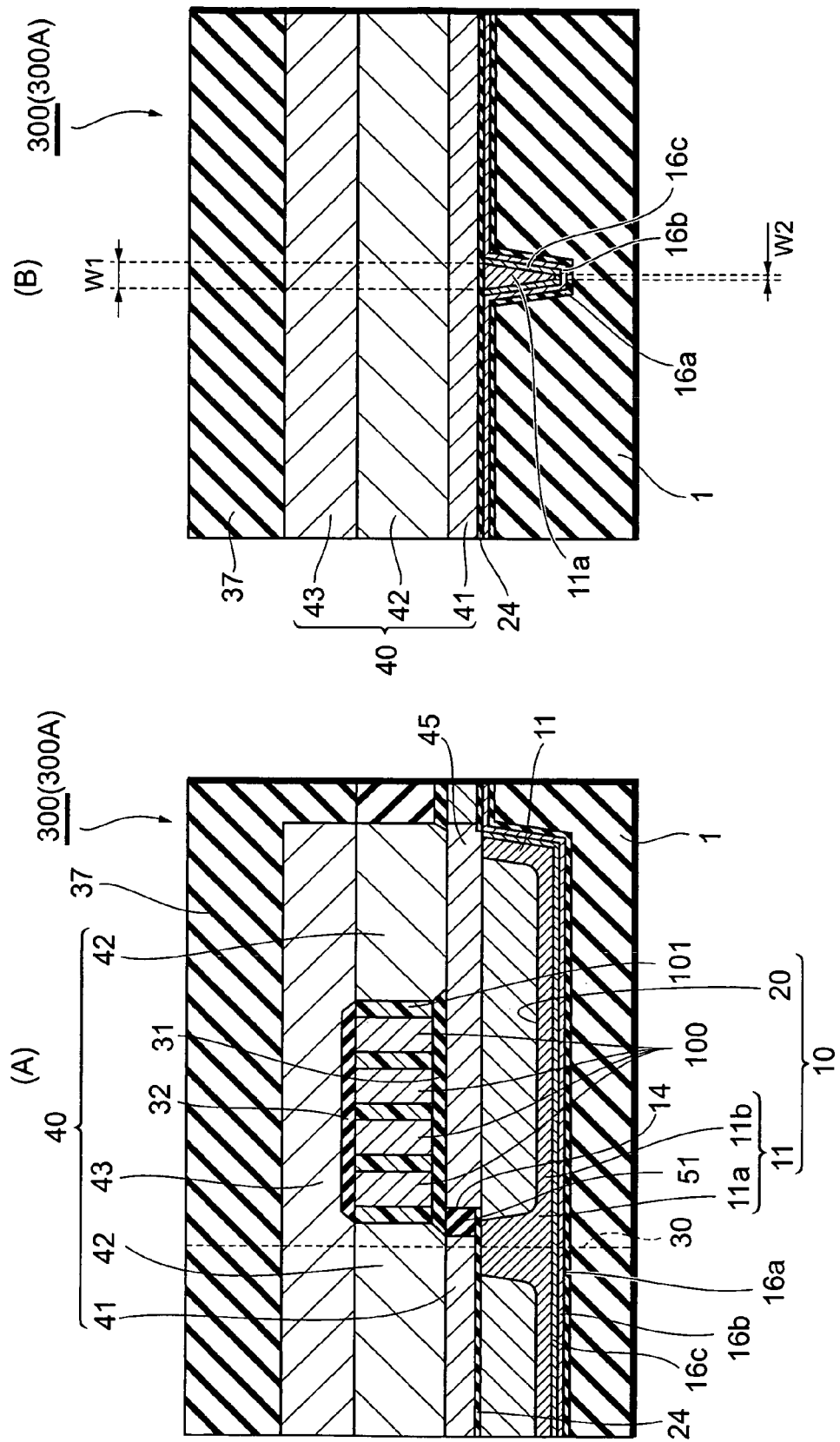
FIG. 1 is a sectional view of the thin-film magnetic head structure related to the present invention, in which (A) is a sectional view taken along a direction intersecting a thin-film coil, and (B) is a sectional view showing the ABS when cut at the ABS.
Figure 2:
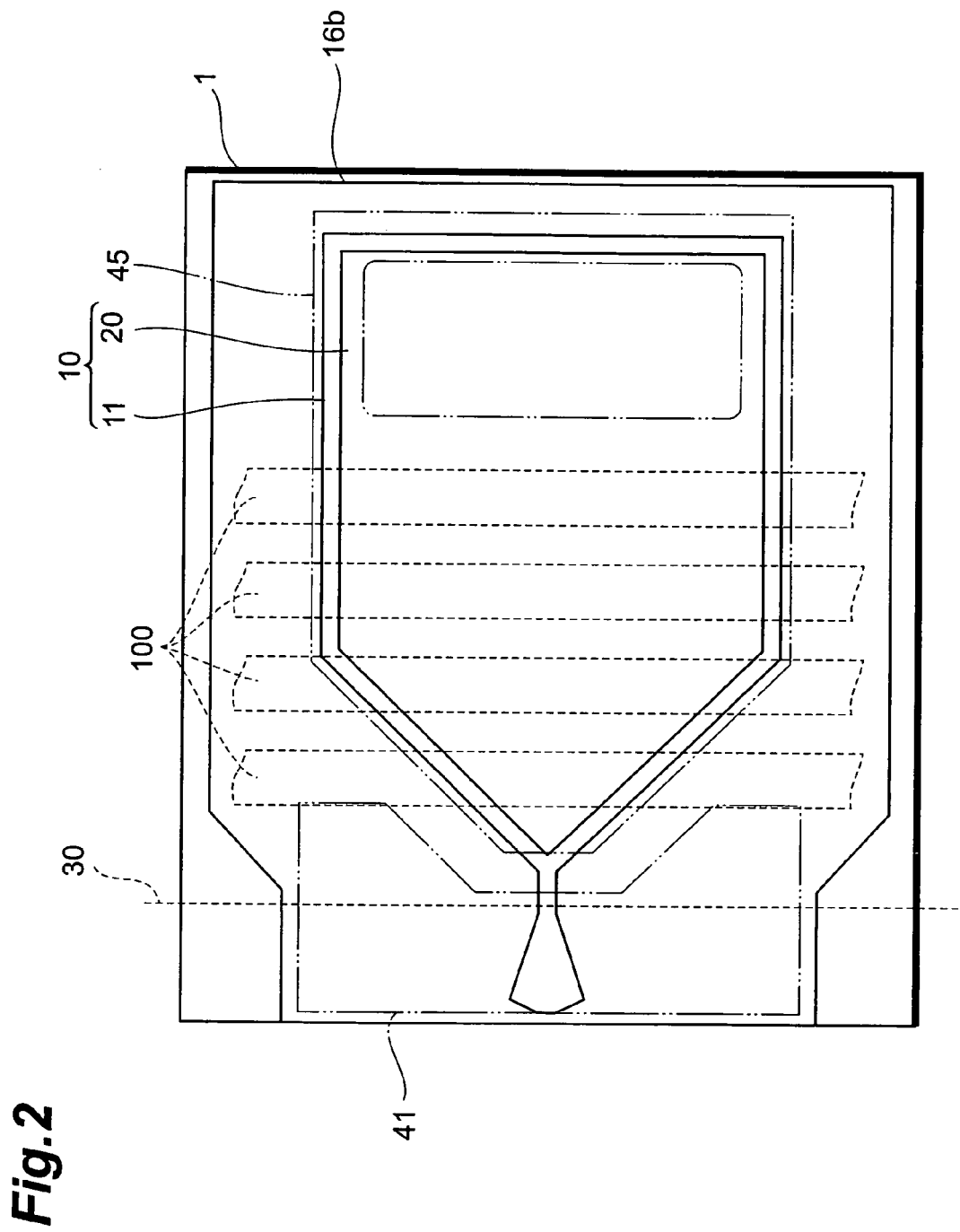
FIG. 2 is a plan view of the thin-film magnetic head structure shown in FIG. 1 as focused on its main magnetic pole layer.

The thin-film magnetic head structure in accordance with the present invention will be explained first with reference to FIGS. 1 to 8, and then the thin-film magnetic head structure in accordance with the first embodiment of the present invention will be explained. FIG. 1 is a sectional view of a thin-film magnetic head structure 300 related to the present invention, in which (A) is a sectional view taken along a direction intersecting a thin-film coil, and (B) is a sectional view showing the ABS when cut at the ABS. FIG. 2 is a plan view of the thin-film magnetic head structure 300 as focused on its main magnetic pole layer 10.

The thin-film magnetic head structure 300 has a configuration adapted to manufacture a magnetic head for perpendicular recording. The thin-film magnetic head structure 300 is formed on a substrate which is not depicted, and yields a thin-film magnetic head in the present invention when cut at an ABS 30 which is a medium-opposing surface opposing a recording medium (hard disk).

The thin-film magnetic head structure 300 comprises a substrate; a reproducing head structure, laminated on the substrate, for manufacturing a reproducing head comprising an MR device (magnetoresistive device) or the like; and a recording head structure for manufacturing a recording head. FIGS. 1(A) and (B) show the recording head structure laminated on the insulating layer 1, while omitting the substrate and the reproducing head structure.

The configuration of a major part of the recording head structure in the thin-film magnetic head structure 300 will be explained in the following, whereas the configuration of the other parts will be explained in manufacturing steps which will be set forth later. Each constituent in the recording head structure will be explained with the same name and numeral before and after being cut at the ABS 30 unless otherwise specified. When distinguishing these states from each other, however, "'" will be added to the numeral referring to the state after being cut at the ABS 30.

The thin-film magnetic head structure 300 comprises the insulating layer 1, and a main magnetic pole layer 10, a recording gap layer 24, a write shield layer 40, and a thin-film coil 100 which are laminated on the insulating layer 1.

Figure 3:
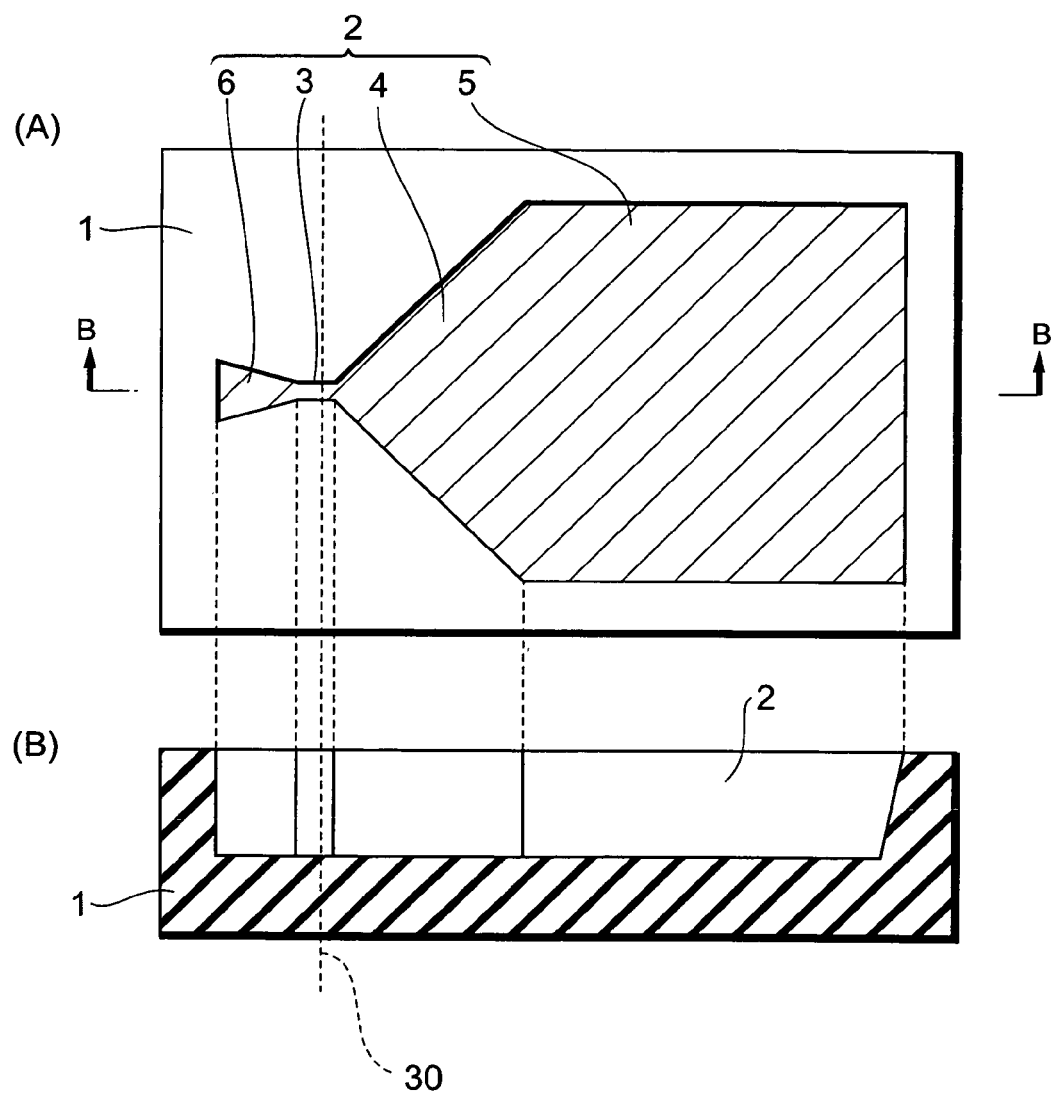
FIG. 3 is a view showing an insulating layer, in which (A) is a plan view, and (B) is a sectional view taken along the line B-B of (A)

The insulating layer 1 is the base insulating layer in the present invention and is formed in a predetermined region on the substrate. FIG. 3 is a view showing the insulating layer 1, in which (A) is a plan view, and (B) is a sectional view taken along the line B-B of (A). FIG. 4 is a view showing a major part of FIG. 3 under magnification, in which (A) is a plan view, and (B) is a sectional view taken along the line B-B of (A). In the insulating layer 1, FIG. 3 shows a rectangular predetermined region focused on a cavity 2 which will be explained later.

The insulating layer 1 is made of alumina ($Al_2O_3$) and has the cavity 2 at a center part (hatched part in FIGS. 3(A) and 4(A)) on the side of a surface to be formed with a recording head. The cavity 2 is the magnetic pole forming depression in the present invention, and is sunken into a form corresponding to the outer shape of the main magnetic pole layer 10 in order to form the main magnetic pole layer 10 in set dimensions and shape. Namely, as will be explained later in detail, the cavity 2 is formed earlier than the main magnetic pole layer 10, such that its dimensions and shape including the depth d1 (about 0.25 to 0.35 μm, preferably 0.3 μm), width, and length coincide with assumed thickness, width, and length of the main magnetic pole layer 10. The cavity 2 includes a very narrow groove part 3, a variable width depression 4, a fixed width depression 5, and a protruded depression 6, whereas a magnetic material embedded therein forms the main magnetic pole layer 10.

The very narrow groove part 3 is formed so as to define the track width of the thin-film magnetic head, and has a structure adapted to improve the recording density by reducing the track width. As shown in FIG. 4, the length of the very narrow groove part 3 is set to L1 (longer than a neck height NH which will be explained later, i.e., L1>NH) such that the ABS 30 can be secured in an intermediate part of the length. The groove width intersecting the length on the surface side is W3, and is W4 on the lower side, whereas the groove widths W3 and W4 are made narrower than the variable width depression 4 and fixed width depression 5 as much as possible, so as to yield a very narrow structure in order to improve the recording density of the thin-film magnetic head. Also, the groove width gradually decreases along the depth such that a magnetic pole end part 11a, which will be explained later, in the main magnetic pole layer 10 has a bevel form. Namely, the groove width W4 is smaller than the groove width W3 (W3>W4) in the very narrow groove part 3, so that the bevel angle θ shown in (B) of FIG. 4 becomes about 7 to 12 degrees (e.g., 10 degrees).

The variable width depression 4, whose groove width gradually increases, is connected to an end part on the deeper side (one side) of the very narrow groove part 3. The fixed width depression 5 having a constant groove width is connected to the variable width depression 4. The variable width depression 4 and fixed width depression 5 in total are wider than the very narrow groove part 3. The distance from the boundary part between the variable width depression 4 and very narrow groove part 3 to the ABS 30 will later become the neck height NH. The protruded depression 6 is connected to the end part of the very narrow groove part 3 opposite from the variable width depression 4.

As shown in FIG. 5, the main magnetic pole layer 10' (as with the main magnetic pole layer 10 before cutting) comprises a base magnetic pole part 11' and an embedded magnetic pole part 20', while further comprising an upper yoke magnetic pole part 45' joined thereto. FIG. 5 is a view showing the main magnetic pole layer 10' and upper yoke magnetic pole part 45' after being cut along the ABS 30, in which (A) is a perspective view, and (B) is a sectional view taken along the line B-B of (A). For convenience of illustration, FIG. 5 shows the upper yoke magnetic pole part 45' by dash-double-dot lines. The main magnetic pole layer 10' is formed so as to be embedded in the cavity 2.

The base magnetic pole part 11' (as with the base magnetic pole part 11 before cutting) comprises a magnetic pole end part 11a having a very narrow width corresponding to the very narrow groove part 3, and a yoke part 11b corresponding to the variable width depression 4 and fixed width depression 5. In order to achieve a higher data recording density by the thin-film magnetic head, the magnetic pole end part 11a has a narrow track width structure in which a width W1 to be explained later is narrowed. However, the base magnetic pole part 11' uses a magnetic material (Hi-Bs material) having a saturated magnetic flux density higher than that of the embedded magnetic pole part 20' so that the magnetic pole end part 11a is not saturated with magnetic fluxes even in the narrow track width structure. The base magnetic pole part 11' and embedded magnetic pole part 20' are magnetized such that the direction of magnetization ms aligns with the ABS 30 (see FIG. 8).

The magnetic pole end part 11a has a fixed width for defining the track width, which is determined by the very narrow groove part 3. As shown in FIG. 1(B), along the ABS 30, the magnetic pole end part 11a has a width W1 on the side closer to the thin-film coil 100, and a width W2 on the side distanced farther from the thin-film coil 100, thereby yielding a bevel form whose width gradually decreases in the direction away from the thin-film coil 100 (W1>W2, whereas the width W1 is the track width). These widths W1 and W2 correspond to the groove widths W3 and W4 of the very narrow groove part 3 in the cavity 2, respectively.

The length of the magnetic pole end part 11a (distance from the ABS 30) corresponds to the neck height NH (which is on the order of 0.1 to 0.3 μm, preferably 0.15 μm in this embodiment).

Leaving a peripheral area 11c corresponding to the variable width depression 4 and fixed width depression 5, the inside of the yoke part 11b is a base depression 11d, in which the embedded magnetic pole part 20 is buried. The yoke part 11b is joined to all the side and bottom faces of the embedded magnetic pole part 20' excluding the upper face. As a consequence, the main magnetic pole layer 10' has an embedded junction structure in which the yoke part 11b excluding the magnetic pole end part 11a of the base magnetic pole part 11' and the embedded magnetic pole part 20' buried in the base depression 11d are joined together. If the same magnetic material as with the base magnetic pole part 11' is used here as a magnetic material constituting the embedded magnetic pole part 20', the pole erasure will be likely to occur. Therefore, the embedded magnetic pole part 20' employs a magnetic material (soft material) having a saturated magnetic flux density lower than that of the magnetic material (Hi-Bs material) for the base magnetic pole part 11'.

The upper yoke magnetic pole part 45' uses a magnetic material (Hi-Bs material) having a saturated magnetic flux density higher than that of the embedded magnetic pole part 20'. At a position distanced farther from the ABS 30 than the recording gap layer 24, the upper yoke magnetic pole part 45' is joined to the surface of the yoke part 11b of the base magnetic pole part 11' and embedded magnetic pole part 20 partly excluding on the ABS 30 side. The upper yoke magnetic pole part 45' corresponds to the yoke magnetic pole part in the present invention.

Referring to FIGS. 1 and 2 again, the recording gap layer 24 is formed between the magnetic pole end part 11a, embedded magnetic pole part 20 and a first shield layer 41 to be explained later in the write shield layer 40 and the insulating part 51. The insulating part 51 is formed by an insulating material buried between the write shield layer 40 and upper yoke magnetic pole part 45 such that no keyholes occur. Further, by way of an insulating film 31 connected to the insulating part 51, the thin-film coil 100 is formed on the surface side of the upper yoke magnetic pole part 45. The surface of the write shield layer 40 is covered with an overcoat layer 37 made of alumina ($Al_2O_3$).

The write shield layer 40 comprises the first shield part 41, a second shield part 42, and a third shield part 43. The first shield part 41 is formed so as to oppose the magnetic pole end part 11a of the base magnetic pole part 11 by way of the recording gap layer 24 on the ABS 30 side, whereby the neck height NH is determined by the distance from the ABS 30 in a direction intersecting the ABS 30.

The second shield part 42 is formed so as to magnetically connect with the first shield part 41 and upper yoke magnetic pole part 45, and has a height equivalent to the thickness of the thin-film coil 100.

The third shield part 43 is formed so as to connect with the second shield part 42 and cover the thin-film coil 100 and a photoresist 101 by way of an insulating layer 32.

The thin-film coil 100 is wound in a planar spiral about the write shield layer 40 while being insulated therefrom by way of the insulating layers 31, 32. Though not depicted, the thin-film magnetic head 100 may be changed to a helical coil spirally wound about the main magnetic pole layer 10.

Between the main magnetic pole layer 10 and the insulating layer 1, an alumina ($Al_2O_3$) film 16a aimed at adjusting the track width, a nonmagnetic film 16b made of Ta or Ru, and a magnetic film 16c made of CoFeN (24 kG) or CoNiFe (10 kG) are formed successively from the insulating layer 1 side. It is desirable for the nonmagnetic film 16b to have a lower resistance so as to become a seed electrode for embedding a magnetic material in the cavity 2 by plating. The magnetic film 16c may be omitted when the nonmagnetic film 16b is formed.

Figure 6:
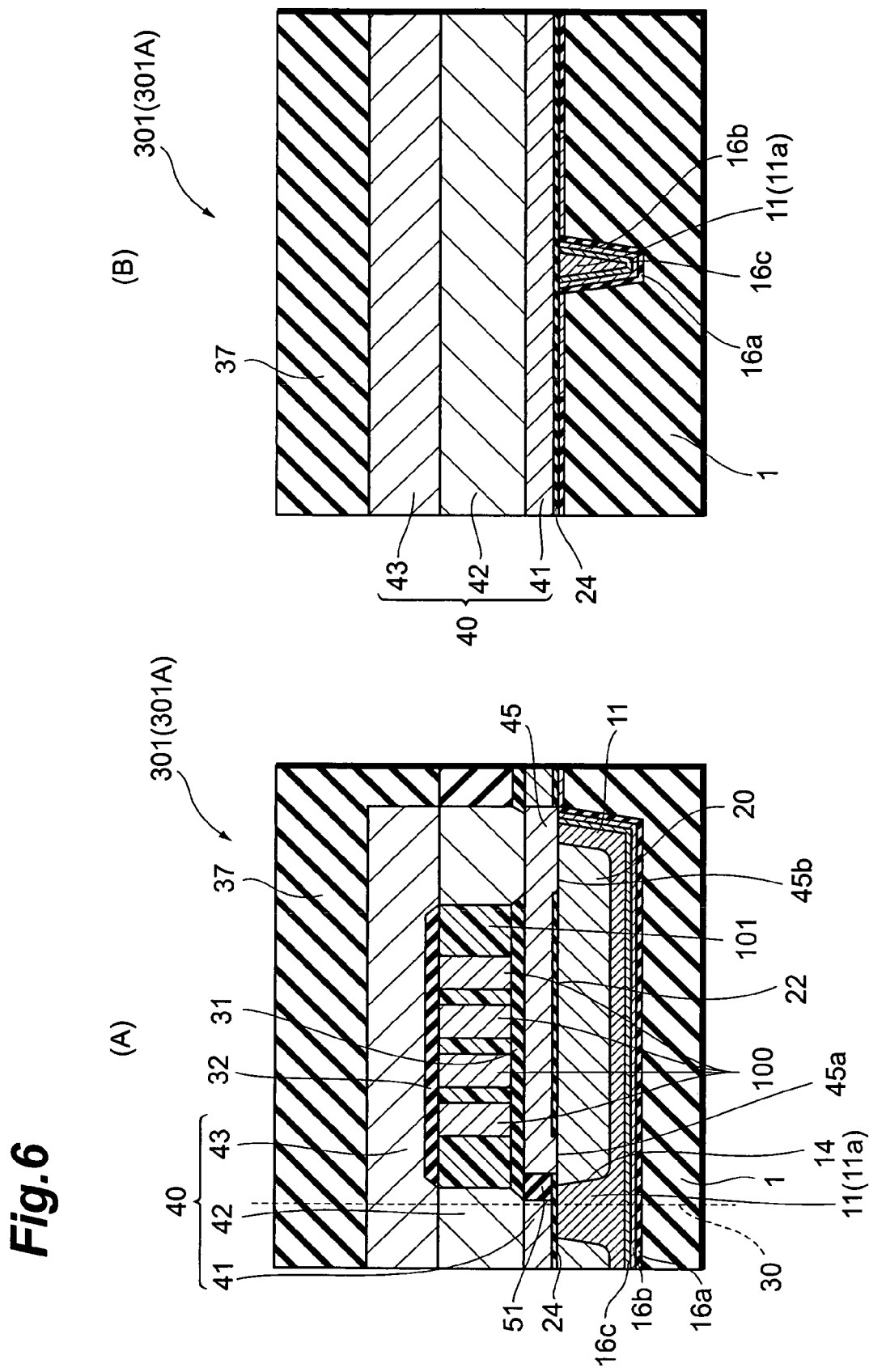
FIG. 6 is a sectional view of the thin-film magnetic head structure in accordance with a first embodiment of the present invention, in which (A) is a sectional view taken along a direction intersecting the thin-film coil, and (B) is a sectional view showing the ABS when cut at the ABS.
Figure 7:
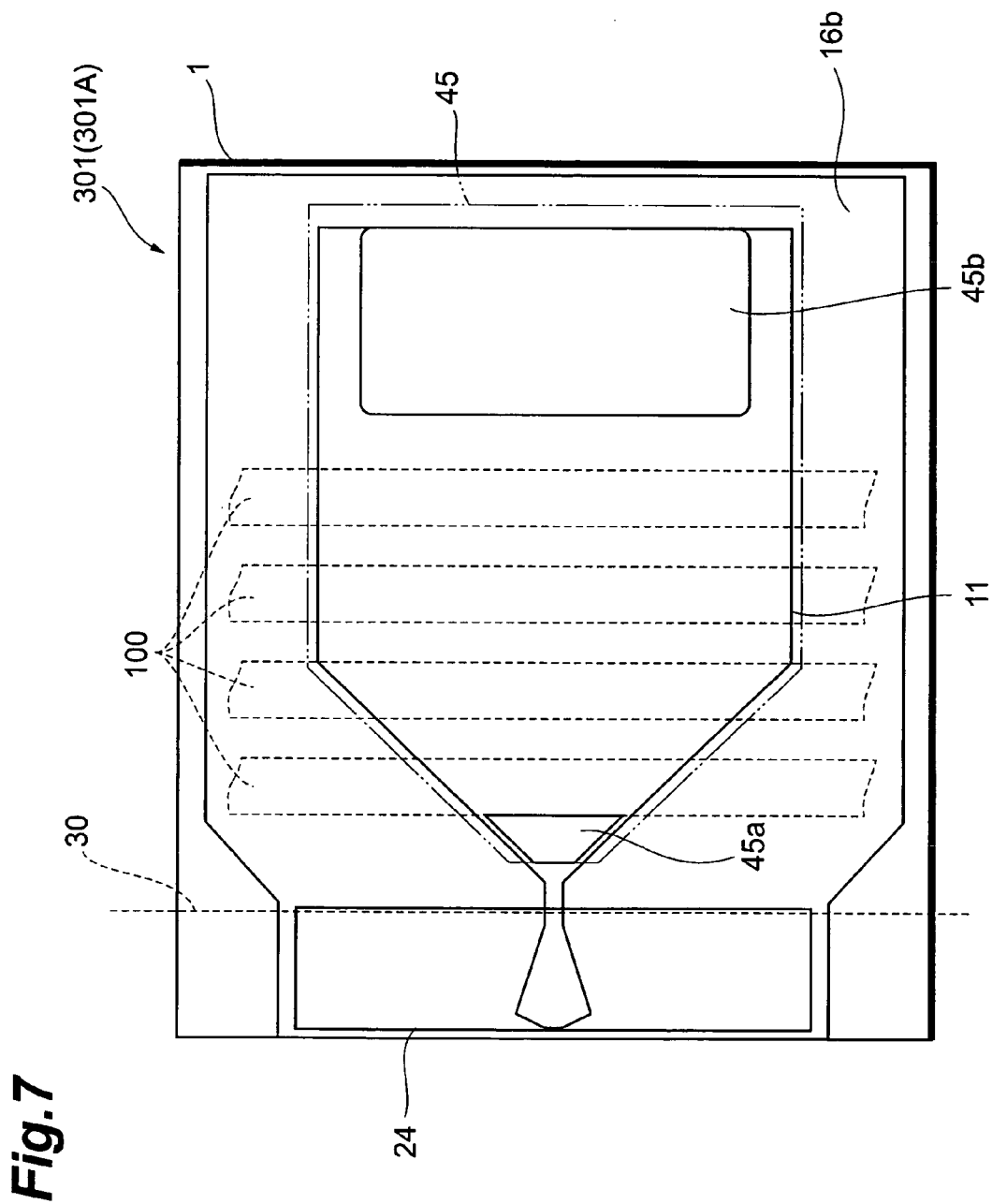
FIG. 7 is a plan view of the thin-film magnetic head structure in accordance with the first embodiment as focused on the main magnetic pole layer.
Figure 8:
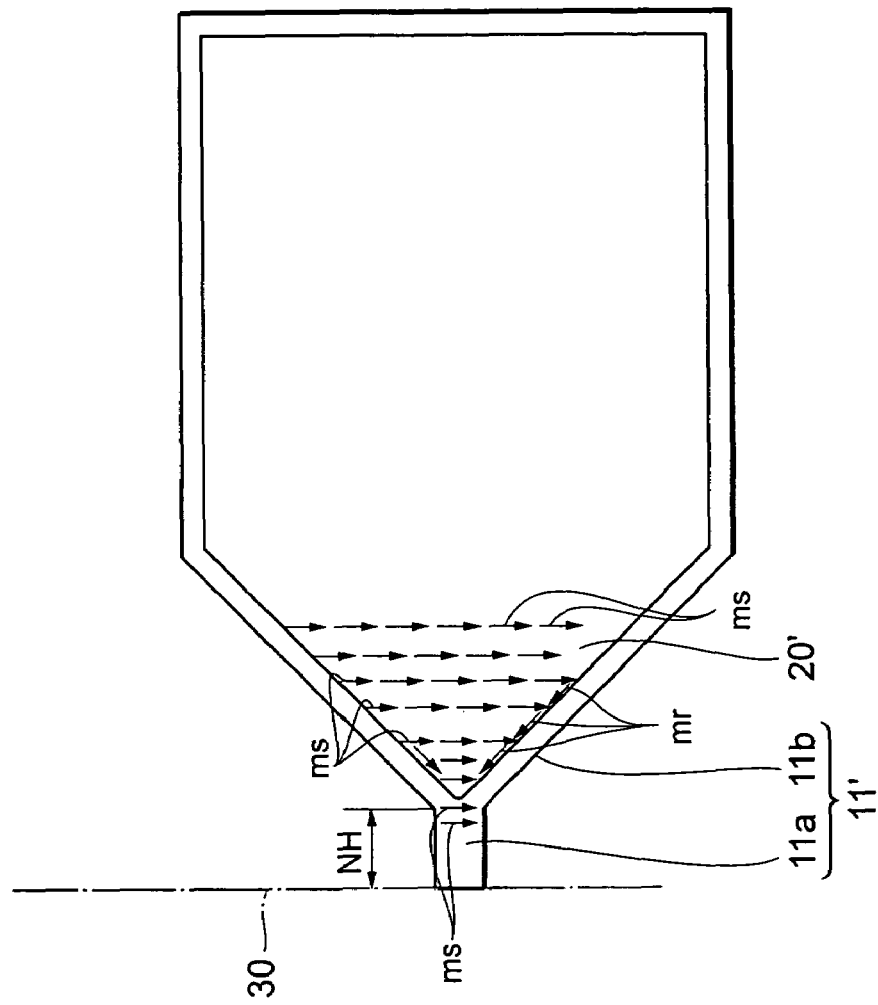
FIG. 8 is a plan view showing the main magnetic pole layer.

In connection with thus configured thin-film magnetic head structure 300 having the foregoing structure, the thin-film magnetic head structure 301 in accordance with the first embodiment of the present invention will be explained. FIG. 6 is a sectional view of the thin-film magnetic head structure in accordance with the first embodiment of the present invention, in which (A) is a sectional view taken along a direction intersecting the thin-film coil, and (B) is a sectional view showing the ABS when cut at the ABS. FIG. 7 is a plan view of the thin-film magnetic head structure focused on its main magnetic pole layer. FIG. 8 is a plan view of the main magnetic pole layer 10'. Since the thin-film magnetic head structure 301 has a structure in common with the above-mentioned thin-film magnetic head structure 300, the following explanation will be focused on features different from each other while omitting or simplifying their common features.

The thin-film magnetic head structure 301 includes an intervening insulative film 22 which is made of the same material as that of the recording gap layer 24 and disposed between the embedded magnetic pole part 20 and the upper yoke magnetic pole part 45 at a position distanced farther from the ABS 30 than the recording gap layer 24. At portions where the intervening insulative film 22 does not exist, the upper yoke magnetic pole part 45 is joined to the embedded magnetic pole part 20. Namely, as shown in FIG. 6, the upper yoke magnetic pole part 45 is joined to the embedded magnetic pole part 20 at a first contact area 45a disposed between the thin-film coil 100 and ABS 30 and at a second contact area 45b at a position distanced farther from the ABS 30 than the thin-film coil 100.

When the thin-film magnetic head structures 300, 301 having the foregoing configuration are cut at an intermediate part of the very narrow groove part 3 so as to form the ABS 30, the thin-film magnetic heads 300A (see FIG. 1) and 301A (see FIG. 6) are obtained.

Figure 29:
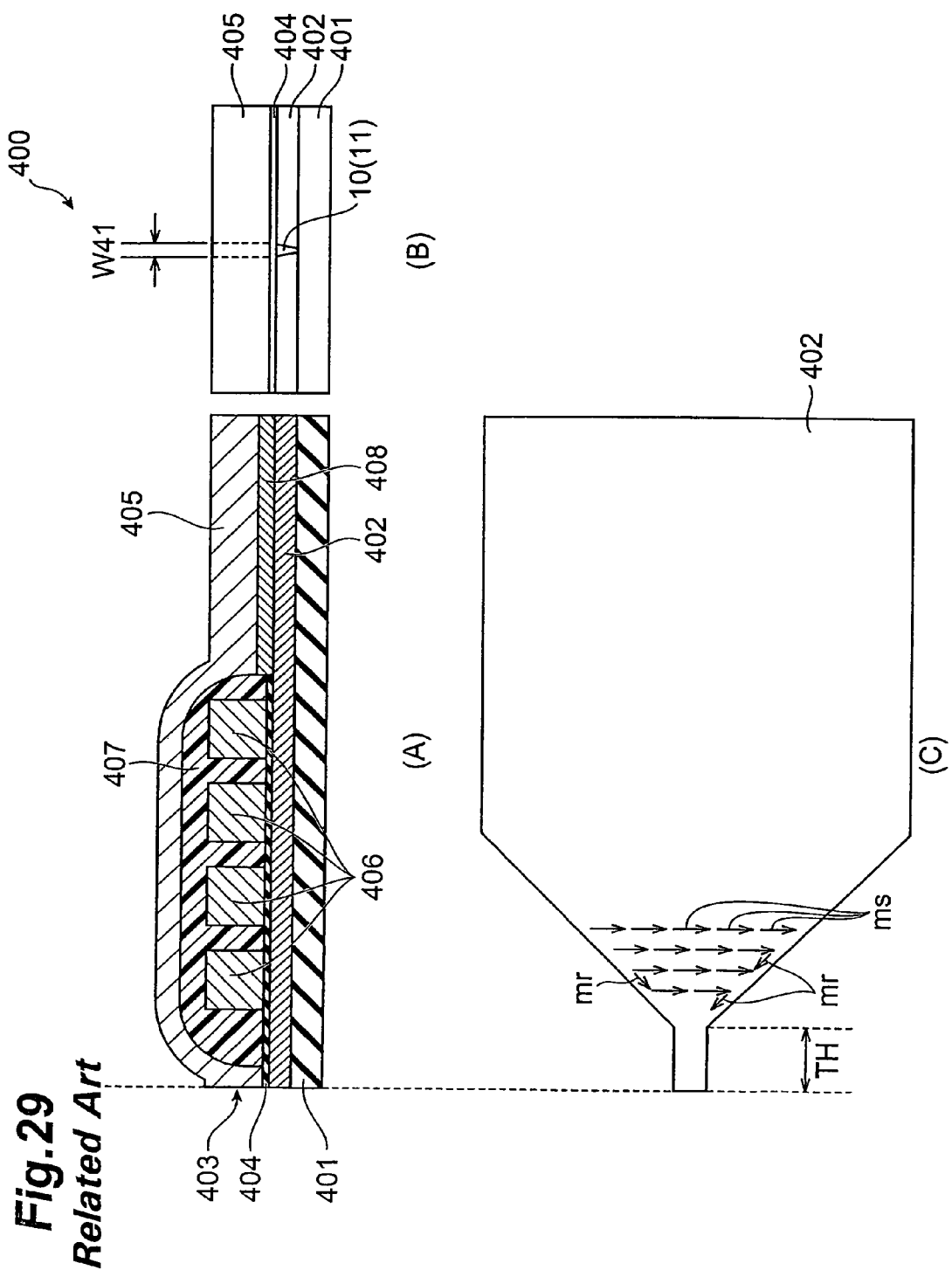
FIG. 29 shows an example of conventional thin-film magnetic heads, in which (A) is a sectional view, (B) is a front view showing the ABS, and (C) is a plan view.

In conventional PMRs, as in the above-mentioned thin-film magnetic head 400 shown in FIG. 29, the main magnetic pole layer 402 is formed by the same magnetic material from the ABS 403 to the opposite end part by way of the thin-film coil. Therefore, the remnant magnetization mr is directed to the ABS 403, thus making it difficult to prevent the pole erasure from occurring.

In the above-mentioned thin-film magnetic heads 300, 301, however, the recording head structure includes the above-mentioned main magnetic pole layer 10, whereas the main magnetic pole layer 10 has an embedded junction structure in which the base magnetic pole part 11 and the embedded magnetic pole part 20 are joined together. As shown in FIGS. 1 and 6, a joint surface 14 between the base magnetic pole part 11 and embedded magnetic pole part 20 (the joint surface between the inner periphery of the base depression 11d in the base magnetic pole part 11 and a side face part of the embedded magnetic pole part 20, a part close to the ABS 30 in particular) blocks the emission of remnant magnetization mr from the embedded magnetic pole part 20 to the base magnetic pole part 11. As a consequence, the thin-film magnetic head structures 300, 301 can make a thin-film magnetic head with reduced remnant magnetization mr directed to the ABS 30 (see FIG. 8). Therefore, using the thin-film magnetic head structures 300, 301 can manufacture a thin-film magnetic head which can effectively prevent the pole erasure from occurring.

Meanwhile, in the case of a conventional PMR in general, the main magnetic pole layer is preferably a magnetic material having a small maximum coercivity Hc (on the order of 2 to 10 Oe) and a small magnetostriction $\lambda$ (1 to $3 \times 10^{-6}$), while it is also preferably a magnetic material having a small magnetostriction $\lambda$ in order to eliminate the pole erasure.

In order to avoid impairment in the overwrite characteristic which occurs with flux saturation even if the track width is narrowed to improve the recording density, the magnetic material of the main magnetic pole layer is preferably formed of a magnetic material with a high saturated magnetic flux density. However, this makes it harder to reduce the magnetostriction λ of the main magnetic pole layer. In view of this point, the above-mentioned thin-film magnetic head structures 300, 301 form the main magnetic pole layer 10 as an embedded junction structure made of the base magnetic pole part 11 and embedded magnetic pole part 20 having respective saturated magnetic flux densities different from each other, while the saturated magnetic flux density of the yoke magnetic pole part 20 is made lower than that of the base magnetic pole part 11, so as to reduce the magnetostriction λ of the embedded magnetic pole part 20. This makes the main magnetic pole layer 10 reduce the magnetostriction λ as a whole. Hence, using the thin-film magnetic head structures 300, 301 yields a thin-film magnetic head 300A, 301A which can more effectively prevent the pole erasure from occurring.

In the thin-film magnetic head structures 300, 301, the upper yoke magnetic pole part 45 is joined to the base magnetic pole part 11 and embedded magnetic pole part 20 in order to enhance the quantity of magnetism. Therefore, both the thin-film magnetic head structures 300, 301 can enhance the quantity of magnetism of the main magnetic pole layer 10 in the vicinity of the ABS 30. Hence, by using the thin-film magnetic head structures 300, 301 thin-film magnetic heads 300A, 301A having a favorable overwrite characteristic can be manufactured.

Here, the thin-film magnetic head structures 300, 301 have a common structure in that they include the upper yoke magnetic pole part 45, and thus exhibit common operations and effects. When the whole rear face of the upper yoke magnetic pole part 45 is joined to the embedded magnetic pole part 20 as in the thin-film magnetic head structure 300, however, it becomes harder to reduce the magnetostriction λ as the main magnetic layer 10 as a whole increases the quantity of magnetism because of the upper yoke magnetic pole 45 joined thereto, whereby the pole erasure is less likely to be prevented from occurring. Therefore, in the thin-film magnetic head structure 301, the intervening insulative film 22 is provided, so that the upper yoke magnetic pole part 45 is joined to the base magnetic pole part 10 and embedded magnetic pole part 20 at the first contact area 45a and the second contact area 45b necessary for joining with the write shield layer 40. Thus, in the thin-film magnetic head structure 301 in particular, the intervening insulative film 22 blocks the emission of remnant magnetization from the upper yoke magnetic pole part 45 to the embedded magnetic pole part 20, so as to prevent the pole erasure from occurring, and enhances the quantity of magnetization due to the upper magnetic pole part 45, thereby making the overwrite characteristic favorable.

On the other hand, the thin-film magnetic head structures 300, 301 include the insulating layer 1 provided with the cavity 2, in which the main magnetic pole layer 10 is embedded, whereby the following operations and effects are exhibited. The operations and effects of the thin-film magnetic head structures 300, 301 and thin-film magnetic heads manufactured by using the thin-film magnetic head structures 300, 301 will now be explained in comparison with the conventional PMRs.

Figure 25:
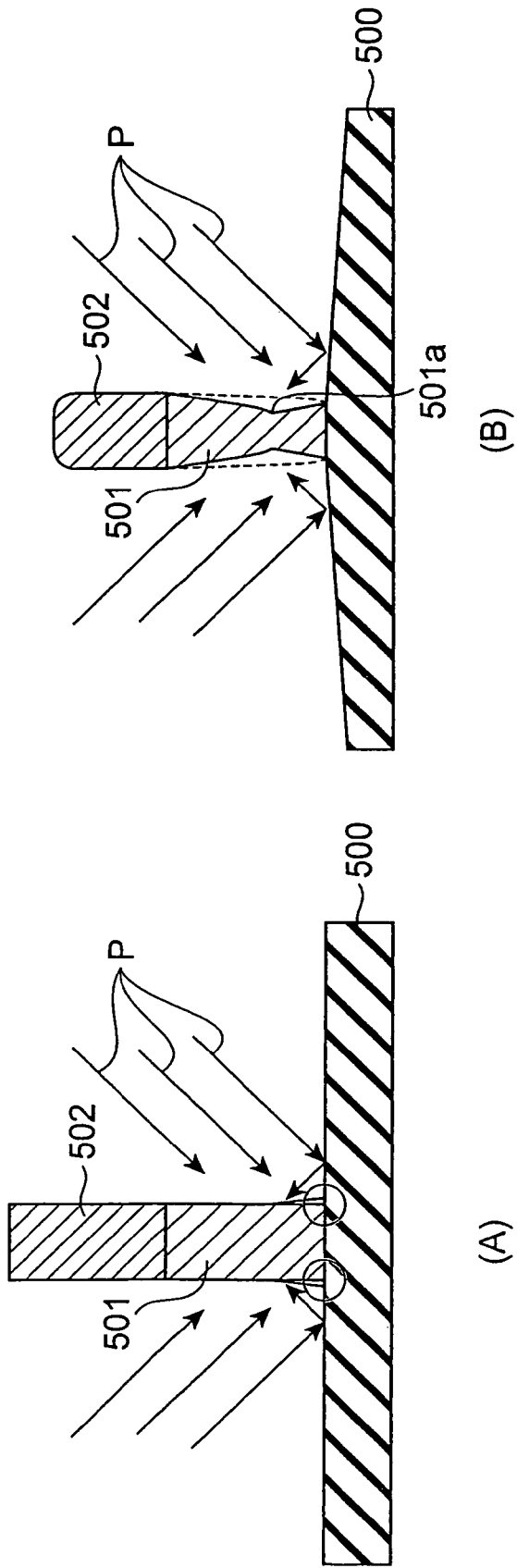
FIG. 25 is a sectional view showing a conventional method of manufacturing a thin-film magnetic head, in which (A) and (B) illustrate respective states before and after etching.

In order for the ABS-side portion of the magnetic pole end part in the main magnetic pole layer to be formed like a bevel, the following procedure has been employed in conventional PMRs. Namely, in the conventional PMRs, there has been a case where, as shown in FIG. 25(A), a main magnetic pole layer 501 formed on an insulating layer 500 is formed with an insulating layer 502 made of alumina, and is subjected to ion beam etching (hereinafter referred to as "IBE") by direct irradiation with ion beams P. In this case, the etching speed by the IBE is slower in the magnetic pole end part in the main magnetic pole layer 501 than in the insulating layer 500, whereby the IBE must be performed for a long time in order for the magnetic pole end part to attain a bevel form. As a consequence, the ABS-side portion of the magnetic pole end part tends to have a form including a narrowed part 501a with a smaller diameter as shown in FIG. 25(B).

Figure 26:
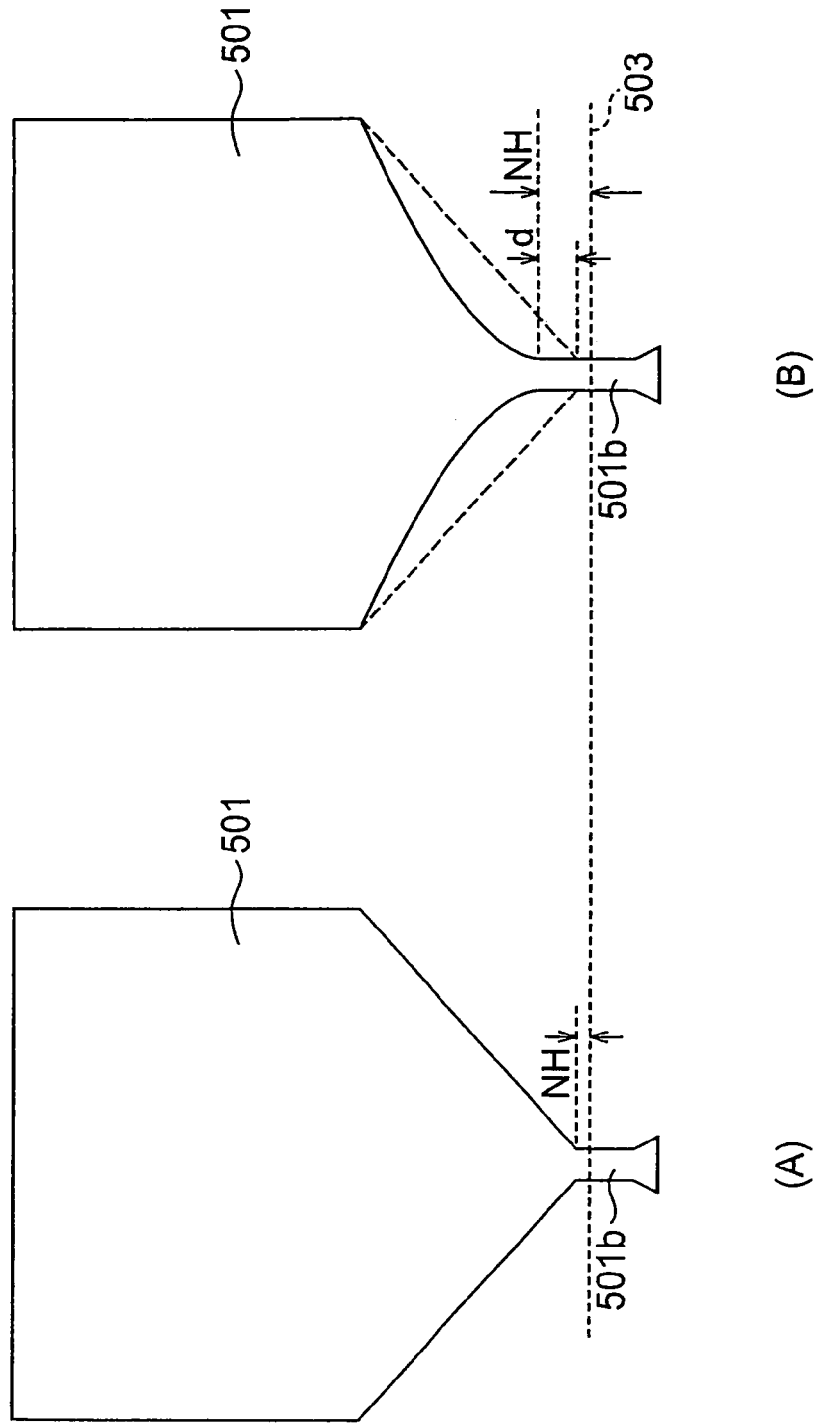
FIG. 26 is a plan view showing the main magnetic pole layer in a conventional thin-film magnetic head, in which (A) illustrates the main magnetic pole layer as set, and (B) illustrates the main magnetic pole layer manufactured.

Therefore, even when the main magnetic pole layer 501 is intended to be formed as shown in FIG. 26(A), a narrow band part 501b corresponding to the track width may retract as shown in FIG. 26(B), so as to yield a flare point, thereby making the neck height NH longer than its expected length (about 0.15 μm) by d (about 0.2 to 0.3 μm). Therefore, the conventional PMRs have been hard to increase the quantity of magnetization in places near the ABS 503, which makes it difficult to yield a favorable overwrite characteristic (a characteristic by which data recorded on a recording medium is overwritten with other kinds of data).

Figure 27:
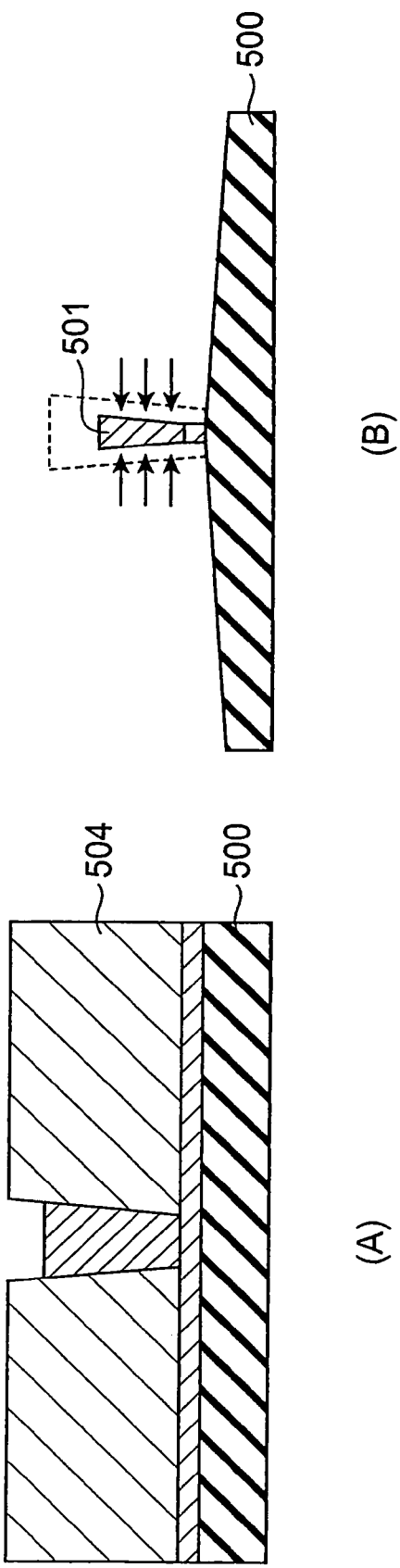
FIG. 27 is a sectional view showing a conventional method of manufacturing a thin-film magnetic head, in which (A) illustrates a state provided with a photoresist, and (B) illustrates a state after removing the photoresist.

The magnetic pole end part in the main magnetic pole layer 501 has conventionally been formed by plating using photolithography. In order for the ABS-side portion to have a bevel form, a resist pattern 504 having a taper angle as shown in FIG. 27(A) may be used. When the track width is to be narrowed in order to improve the recording density in this case, the ion beams P must be emitted after removing the resist pattern 504 as shown in FIG. 27(B), so as to perform trimming with the IBE for a long time. This may make the track width unfavorable or deteriorate the yield.

Figure 28:
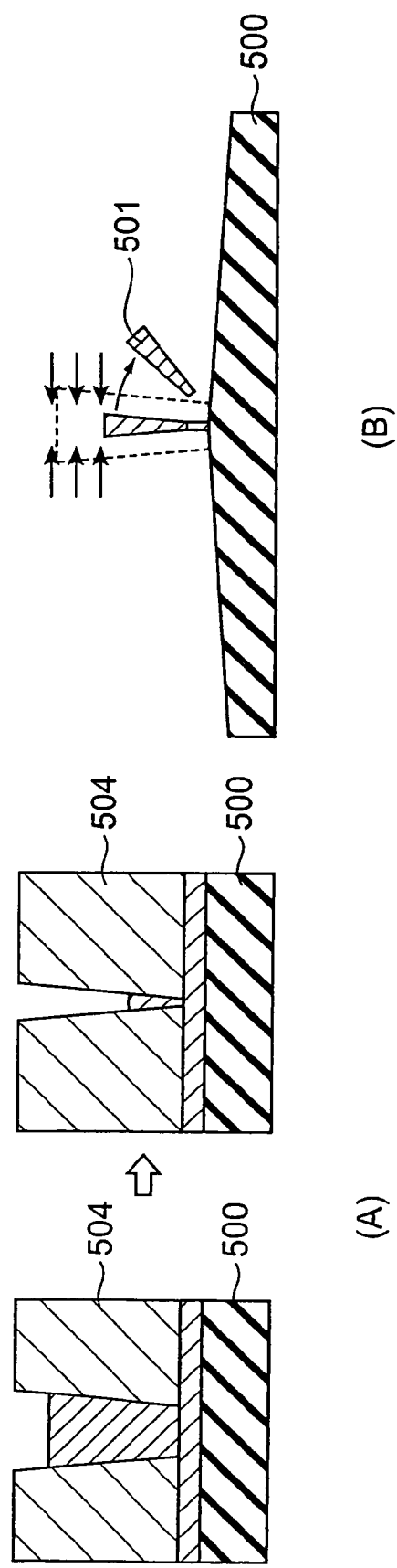
FIG. 28 is a sectional view showing a conventional method of manufacturing a thin-film magnetic head, in which (A) illustrates a state provided with another photoresist, and (B) illustrates a state after removing the photoresist.

On the other hand, it has been quite difficult to perform plating while using a narrow resist pattern, thus leaving a fear of the formed magnetic pole end part falling down because of the IBE as shown in FIGS. 28(A) and (B).

Thus, the conventional PMRs have also been problematic in that the main magnetic pole layer becomes harder to form reliably when the recording density is to be improved.

By contrast, the thin-film magnetic head structures 300, 301 include the insulating layer 1 provided with the cavity 2, in which the main magnetic pole layer 10 is embedded, and thus can eliminate all of the foregoing problems.

Namely, since the cavity 2 is sunken into a form corresponding to the outer shape of the main magnetic pole layer 10, the main magnetic pole layer 10 can be formed in the shape and dimensions as set when formed so as to be embedded into the cavity 2. Since the track width is determined by the very narrow groove part 3 of the cavity 2, there is no need to perform the IBE for a long time at all in order for the magnetic pole end part to have a bevel form. Therefore, the neck height can be set to a value as assumed, the quantity of magnetism in places near the ABS 403 can be enhanced, and a thin-film magnetic head having a favorable overwrite characteristic can be manufactured.

The track width can be narrowed if the width of the narrow groove part 3 is reduced as much as possible, whereas the narrow groove part 3 can set the track width to a value assumed. Therefore, not only the track width is narrow, but also the dimensional accuracy and yield become favorable, and there is no fear of the formed magnetic pole end part falling down. Therefore, providing the cavity 2 as in the thin-film magnetic head structures 300, 301 can reliably form the main magnetic pole layer having an enhanced recording density.

Modified Example 1

Figure 9:
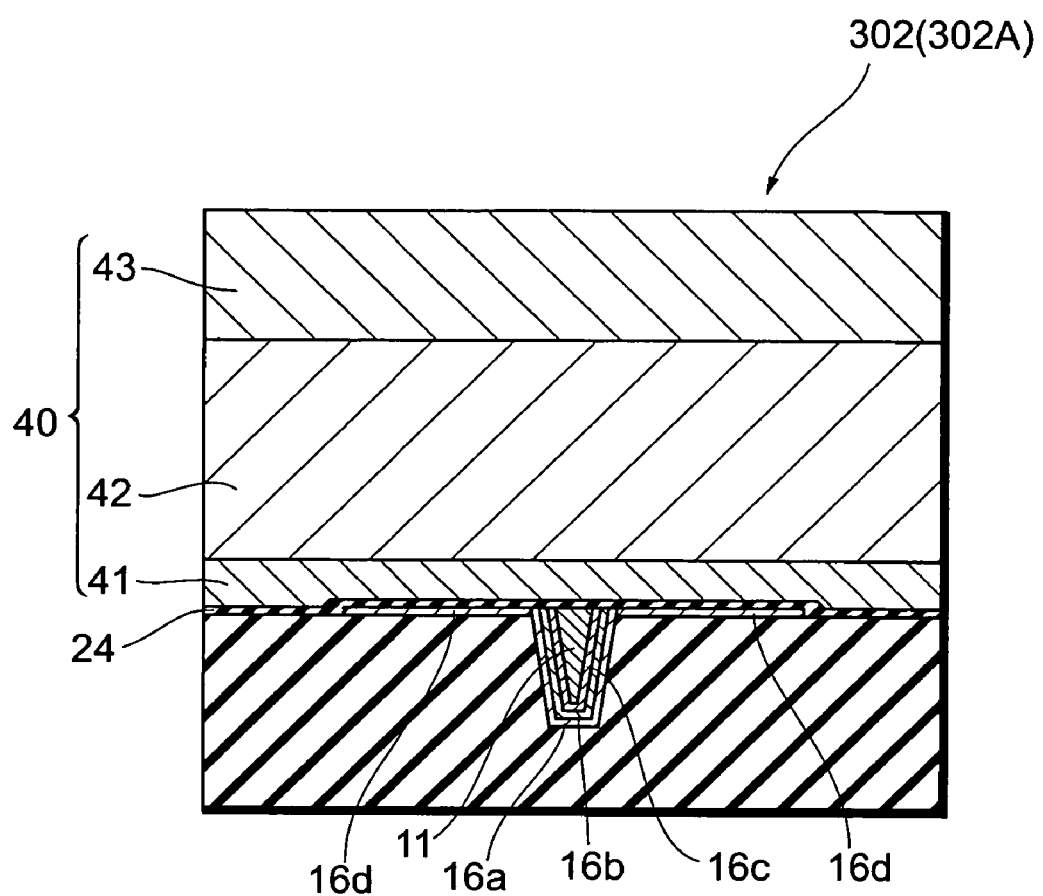
FIG. 9 is a sectional view showing the ABS in a first modified example of the thin-film magnetic head structure in accordance with the present invention when cut at the ABS.

In the above-mentioned thin-film magnetic head structure 301, as shown in FIG. 6(B), two layers composed of the alumina ($Al_2O_3$) film 16a and nomagnetic film 16b exist on the surface of the insulating film 1 on the side closer to the thin-film coil 100, whereas the recording gap layer 24 is formed on these layers. However, as shown in FIG. 9, a thin-film magnetic head structure 302 may be constructed such that a Ta film 16d is formed on the surface of the insulating layer 1 whereas the recording gap layer 24 is formed on the Ta film 16d. In this case, the thin-film magnetic head structure 302 also exhibits operations and effects similar to those of the thin-film magnetic head structures 300, 301 and the thin-film magnetic heads 300A, 301A manufactured by using the thin-film magnetic head structures 300, 301.

Modified Example 2

Figure 10:
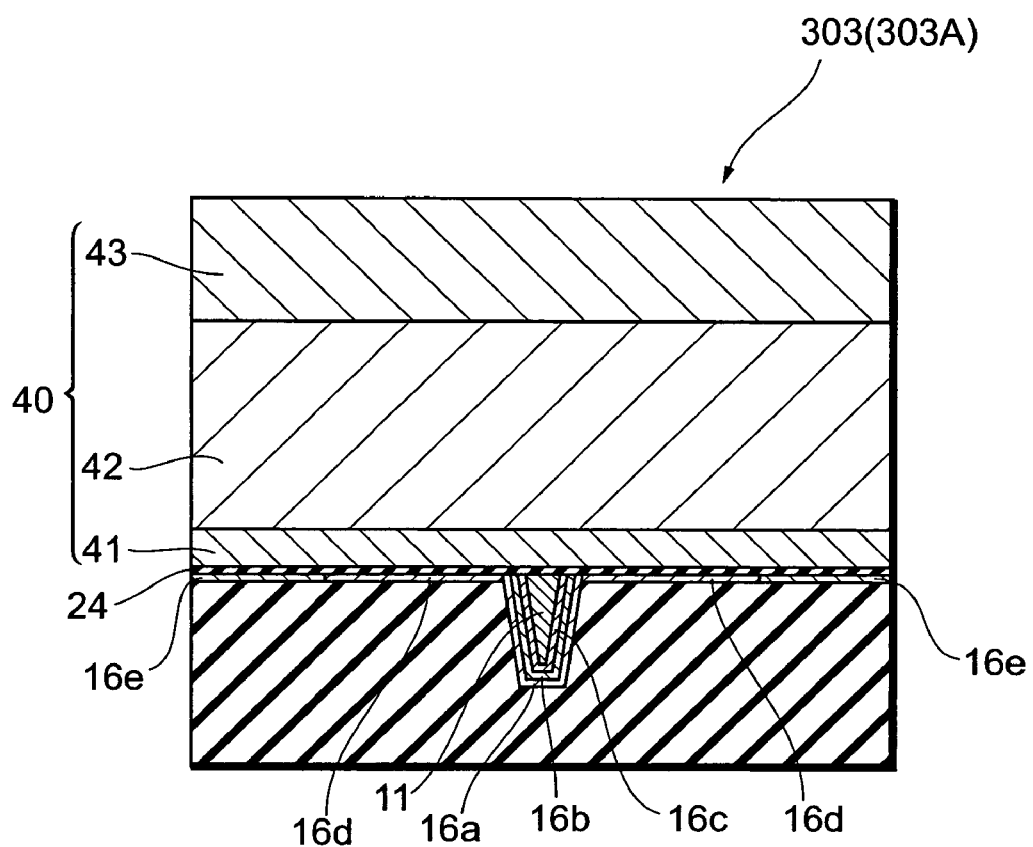
FIG. 10 is a sectional view showing the ABS in a second modified example of the thin-film magnetic head structure in accordance with the present invention when cut at the ABS.

As in the thin-film magnetic head structure 303 shown in FIG. 10, an insulating film 16e may be provided so as to surround the Ta film 16d in the above-mentioned thin-film magnetic head structure 302, with the recording gap layer 24 being formed on the Ta film 16d and insulating film 16e. Operations and effects similar to those of the above-mentioned thin-film magnetic head structures 300, 301 and the thin-film magnetic heads 300A, 301A manufactured by using the thin-film magnetic head structures 300, 301 are also exhibited in this case.

Method of Manufacturing Thin-Film Magnetic Head Structure

Figure 11:
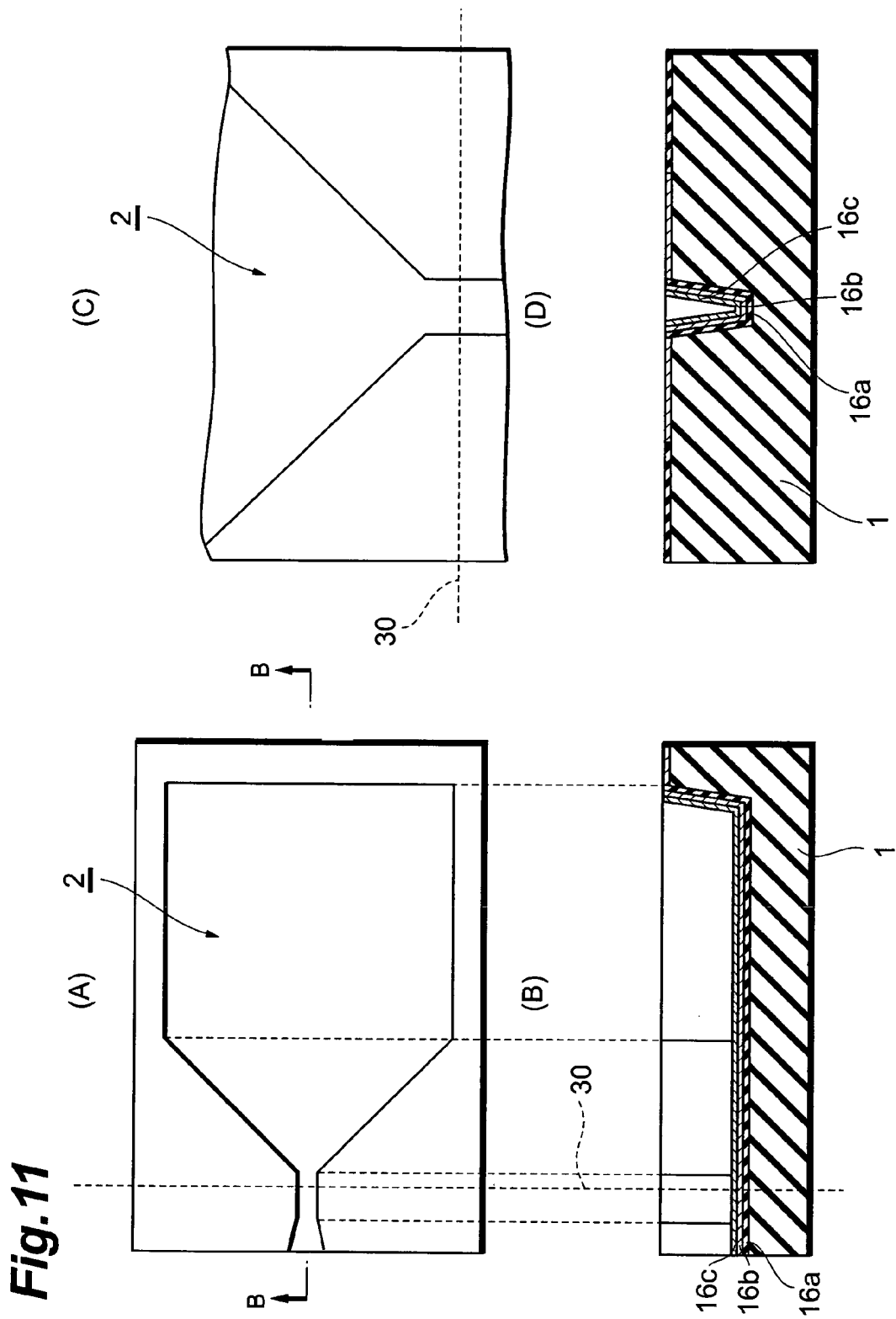
FIG. 11 is a plan view or sectional view in a step of the manufacturing method in accordance with the first embodiment, in which (A) is a plan view, (B) is a sectional view taken along the line B-B of (A), (C) is a plan view showing a major part of (A) under magnification with changed ratios of dimensions, and (D) is a sectional view taken at the ABS 30 in (B)
Figure 12:
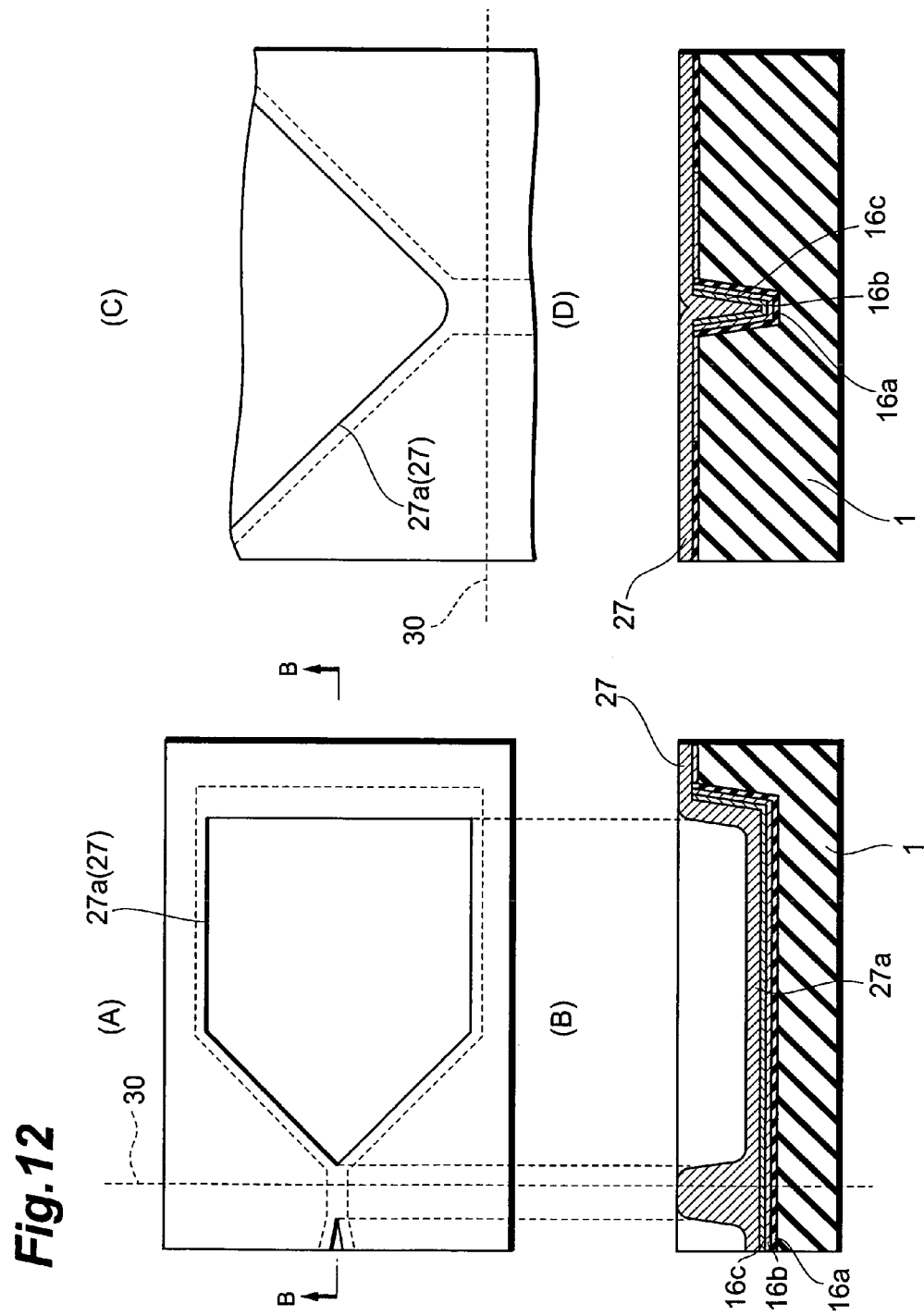
FIG. 12 is a plan view or sectional view in a step subsequent to FIG. 11, in which (A) is a plan view, (B) is a sectional view taken along the line B-B of (A), (C) is a plan view showing a major part of (A) under magnification with changed ratios of dimensions, and (D) is a sectional view taken at the ABS 30 in (B)
Figure 13:
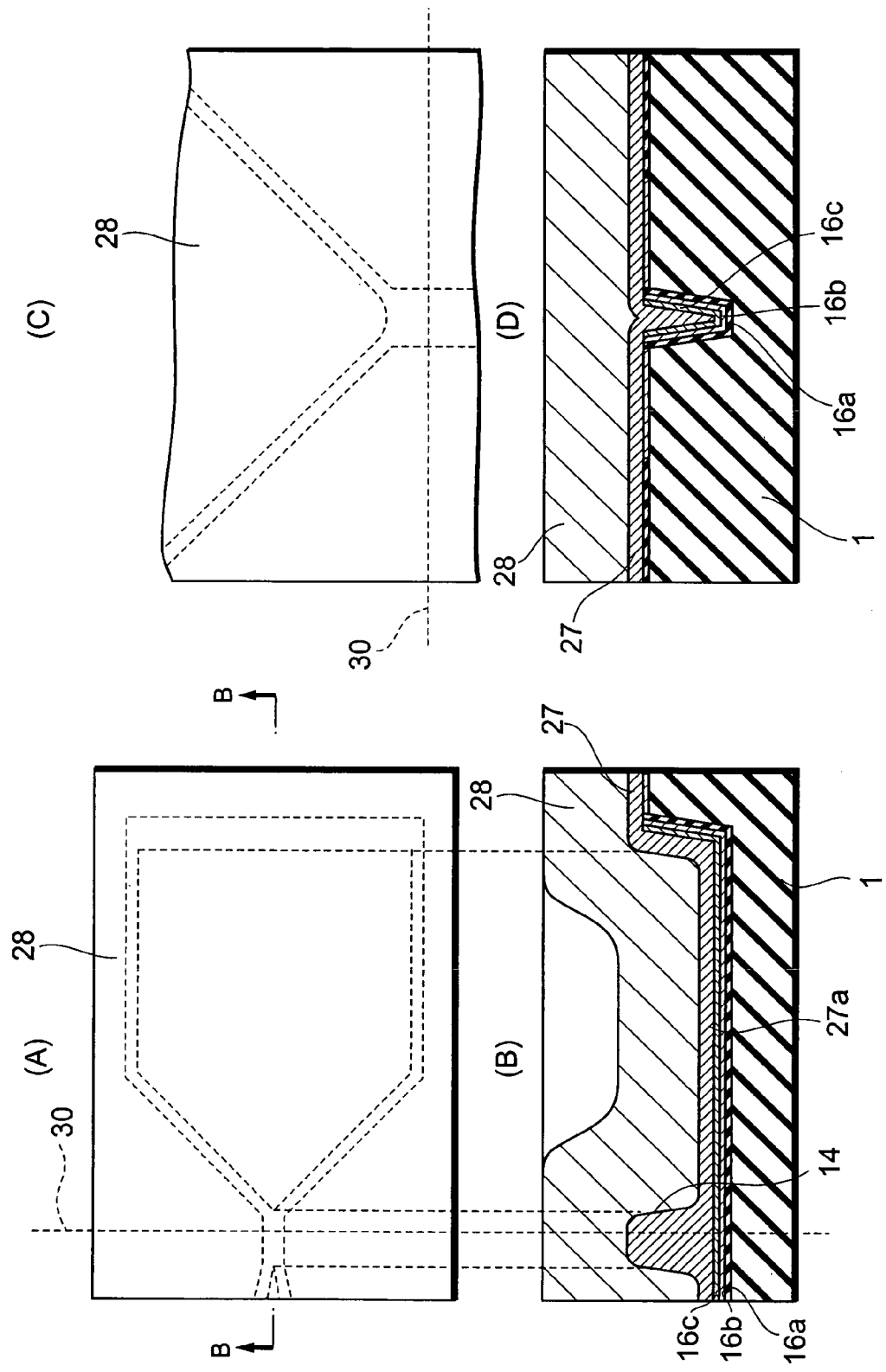
FIG. 13 is a plan view or sectional view in a step subsequent to FIG. 12, in which (A) is a plan view, (B) is a sectional view taken along the line B-B of (A), (C) is a plan view showing a major part of (A) under magnification with changed ratios of dimensions, and (D) is a sectional view taken at the ABS 30 in (B)
Figure 14:
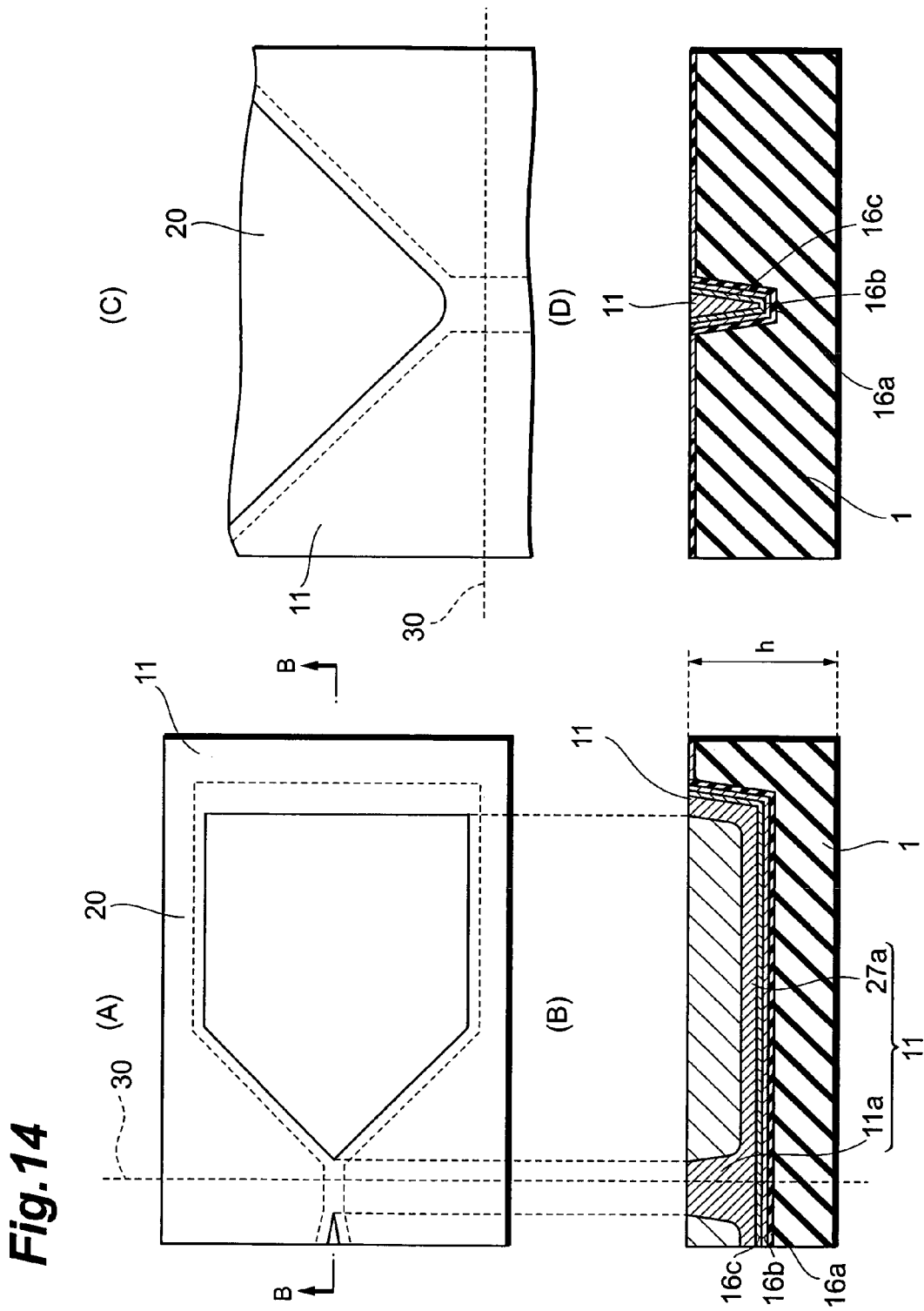
FIG. 14 is a plan or sectional view in a step subsequent to FIG. 13, in which (A) is a plan view, (B) is a sectional view taken along the line B-B of (A), (C) is a plan view showing a major part of (A) under magnification with changed ratios of dimensions, and (D) is a sectional view taken at the ABS 30 in (B)

With reference to FIGS. 1, 3(A) and (B), 4(B) and 6(A) and (B) mentioned above and FIGS. 11(A), (B), (C), and (D) to 16(A) and (B), a method of manufacturing the thin-film magnetic head structure 301 in accordance with the first embodiment having the above-mentioned structure will now be explained.

Figure 15:
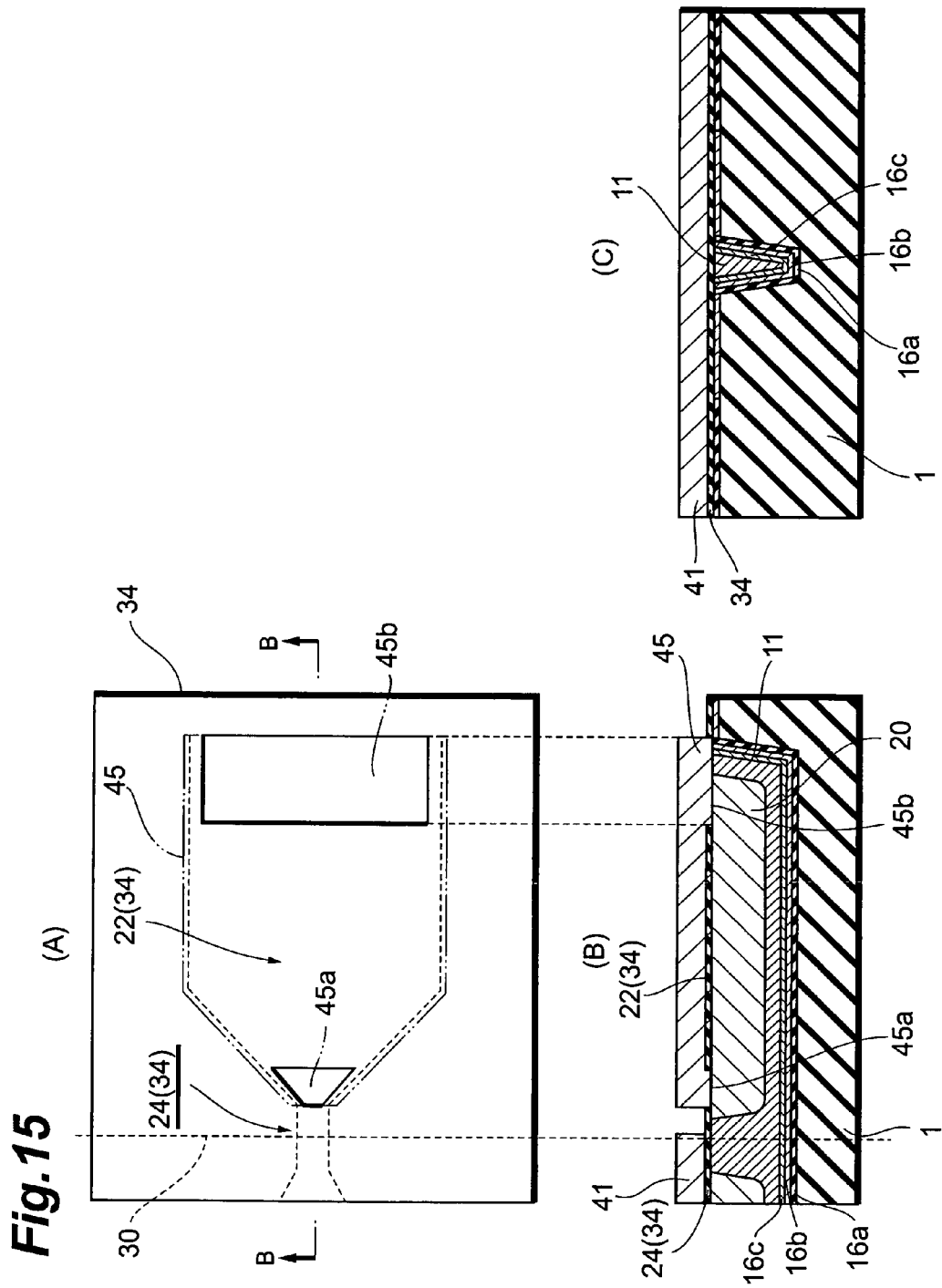
FIG. 15 is a plan view or sectional view in a step subsequent to FIG. 14, in which (A) is a plan view showing an intervening insulative film and its surroundings, (B) is a sectional view taken along the line B-B of (A), and (C) is a sectional view taken at the ABS 30 in (B)
Figure 16:
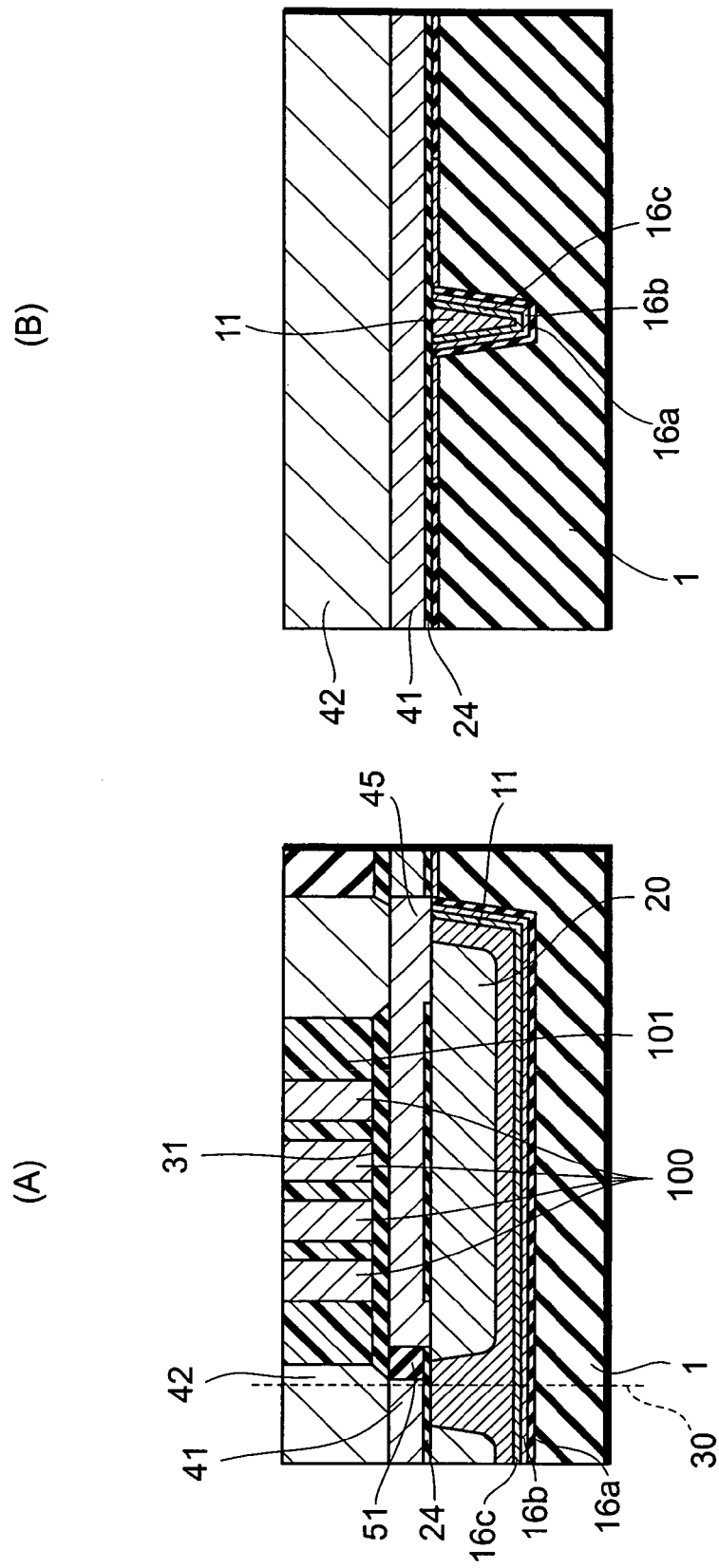
FIG. 16 is a sectional view in a step subsequent to FIG. 15, in which (A) is a sectional view corresponding to the line B-B in FIGS. 15(A), and (B) is a sectional view cut at the ABS in (A)

FIGS. 11 to 14 show plan or sectional views in respective steps of the manufacturing method, in which (A) is a plan view, (B) is a sectional view taken along the line B-B of (A), (C) is a plan view showing a major part of (A) under magnification, and (D) is a sectional view taken at the ABS 30 of (B). For convenience of illustration, (C) in each drawing shows the major part of (A) under magnification with changed ratios of dimensions. In FIG. 15, (A) is a plan view focused on the intervening insulative film in the middle of manufacture, (B) is a sectional view taken along the line B-B of (A), and (C) is a sectional view taken at the ABS 30 in (B). In FIG. 16, (A) is a sectional view corresponding to the line B-B in FIG. 15(A), whereas (B) is a sectional view taken at the ABS 30 in (A).

First, in the manufacturing method in accordance with this embodiment, a reproducing head structure comprising an MR device (magnetoresistive device) and the like is laminated on an undepicted substrate made of aluminum oxide titanium carbide ($Al_2O_3 \cdot TiC$), for example. Subsequently, an insulating layer 1 is formed from alumina ($Al_2O_3$) or a nonmagnetic material.

After a photoresist is applied onto the insulating layer 1, patterning is performed with a predetermined photomask, so as to yield a resist pattern exposing the surface of the insulating layer 1 into a form corresponding to the cavity 2. Using this resist pattern as a mask, reactive ion etching (hereinafter referred to as "RIE") is carried out, so as to remove the part of insulating layer 1 not covered with the resist pattern, whereby the cavity 2 is formed as shown in FIGS. 3(A) and (B). The (very narrow groove part 3 of the) cavity 2 formed at that time determines the track width and neck height NH of the thin-film magnetic head.

Next, as shown in FIGS. 11(A), (B), (C), and (D), a CVD-$Al_2O_3$ film (alumina film) 16a is formed on the whole surface of the insulating layer 1 by a thickness of 100 to 500 Å by the atomic layer method in order to adjust the track width. Instead of the alumina film 16a, a coating made of Ta, W, TiN, or the like may be formed by a thickness of about 200 to 500 Å by CVD or sputtering. Subsequently, a nonmagnetic film 16b is formed by a thickness of about 400 to 600 Å by sputtering or IBD (ion beam deposition) so as to cover the cavity 2. It will be preferred if the nonmagnetic film 16b is formed from a Ta film or an Ru film whose resistance is lower than that of the Ta film, since thus formed film becomes a seed electrode for plating a magnetic material which will be explained later. In this case, the resistance is preferably lower. Thereafter, a magnetic film 16c made of CoFeN (24 kG) or CoNiFe (10 kG) is formed on the whole surface of the insulating layer 1 by a thickness of 300 to 600 Å. The magnetic film 16c can be omitted as appropriate when the nonmagnetic film 16b made of the Ta film or Ru film to become the seed electrode is formed.

Subsequently, using a first magnetic material made of CoNiFe or CoFe having a high saturated magnetic flux density (about 2.3 to 2.4 T), a plating film 27 for forming the film-like magnetic pole part of the present invention is formed on the magnetic film 16c as shown in FIGS. 12(A), (B), (C), and (D). This plating film 27 can selectively be formed on the whole surface of the insulating layer 1 or only within the cavity 2. The plating film 27 is embedded in the very narrow groove part 3 of the cavity 2. However, the area other than the very narrow groove part 3 in the cavity 2, i.e., the area of the variable width depression 4 and fixed width depression 5, is wider than the very narrow groove part 3 and thus is not filled with the plating film 27, whereby a film-like magnetic pole part 27a is formed on the inner periphery of the cavity 2 in the area other than the very narrow groove part 3. The film-like magnetic pole part 27a is continuously formed until the very narrow groove part 3 is filled (with the plating film 27), whereby the film-like magnetic pole part 27a is formed like a thin film having a thickness corresponding to the size (volume) of the very narrow groove part 3. Here, the very narrow groove part 3 is a very narrow area. Therefore, the film-like magnetic pole part 27a attains a very small film thickness of 0.1 to 0.2 μm when formed until the very narrow groove part 3 is filled. When the film-like magnetic pole part 27a is very thin, an embedded magnetic pole part 20 to be explained later is located very close to the base magnetic pole part 11, by which the neck height NH can be made longer while suppressing the occurrence of pole erasure, whereby the track width becomes stable when cut at the ABS 30.

Next, as shown in FIGS. 13(A), (B), (C), and (D), a plating film 28 for embedding a second magnetic material different from the first magnetic material into the inside of the film-like magnetic pole part 27a is formed. Here, a magnetic material (e.g., a soft material such as FeNi having a saturated magnetic flux density of about 2.1 T or CoNiFe having a saturated magnetic flux density of about 1.9 T) whose saturated magnetic flux density is lower than that of the first magnetic material is used as the second magnetic material. Embedding the second magnetic material yields an embedded junction structure in which the film-like magnetic pole part 27a using the first magnetic material and the plating film 28 using the second magnetic material are joined together, and simultaneously forms a joint surface 14 between the film-like magnetic pole part 27a and the plating film 28. In the plating film 28, the second magnetic material embedded in the inside of the film-like magnetic pole part 27a becomes the embedded magnetic pole part 20 as will be explained later.

Subsequently, as shown in FIGS. 14(A), (B), (C), and (D), the whole surface of the substrate including the surface of the plating films 27 and 28 on the side closer to the thin-film coil 100 is subjected to chemical mechanical polishing (hereinafter referred to as "CMP") as a surface-flattening process. As a result of the surface-flattening process, the first magnetic material embedded in the very narrow groove part 3 forms a magnetic pole end part 11a, thus yielding a main magnetic pole layer 10 having an embedded junction structure in which a base magnetic pole part 11 composed of the magnetic pole end part 11a and film-like magnetic pole part 27 and the embedded magnetic pole part 20 constituted by the second magnetic material are joined together. Here, the nonmagnetic film 16b made of Ta, Ru, or the like functions as a stopper, so that the height h1 from the bottom face of the insulating layer 1 to the surface of the base magnetic pole part 11 and embedded magnetic pole part 20 is regulated such that the depth d1 of the cavity 2 (see FIG. 4(B)) is on the order of 0.2 to 0.35 μm.

Next, as shown in FIGS. 15(A), (B), and (C), a coating 34 for forming a recording gap layer 24 and an intervening insulative film 22 is formed by a thickness of 400 to 500 Å so as to cover the whole upper face of the substrate including the base magnetic pole part 11 and embedded magnetic pole part 20. The material of the coating 34 may be either an insulating material such as alumina or a nonmagnetic metal material such as Ru, NiCu, Ta, W, Cr, $Al_2O_3$, $Si_2O_3$, or NiPd.

Thereafter, in the coating 34, a part to be formed with a first shield part 41, and a first contact area 45a and a second contact area 45b which are used for joining an upper yoke magnetic pole part 45 to be explained later to the base magnetic pole part 11 and embedded magnetic pole part 20 are opened, and then the first shield part 41 and the yoke magnetic pole part 45 are formed. In this case, the first shield part 41 is formed so as to oppose the magnetic pole end part 11a of the base magnetic pole part 11 by way of the recording gap layer 24 in order to define the neck height NH. The upper yoke magnetic pole part 45 is connected to portions where the intervening insulative film 22 does not exist, i.e., at the first and second contact areas 45a, 45b. In this case, the intervening insulative film 22 is formed by the part of coating 34 disposed between the embedded magnetic pole part 20 and the upper yoke magnetic pole part 45 at a position distanced farther from the ABS 30 than the recording gap layer 24. The foregoing first shield part 41 and upper yoke magnetic pole part 45 can be formed by plating with a magnetic material of CoNiFe (1.9 to 2.4 T) or NiFe (0.8 to 1.2 T) so as to attain a thickness of 0.8 to 1.2 μm.

For improving the overwrite characteristic by enhancing the quantity of magnetization in the main magnetic pole layer 10 as a whole, it will be preferred that the upper yoke magnetic pole part 45 is formed by a magnetic material having a higher saturated magnetic flux density. On the other hand, the pole erasure is more likely to occur as the saturated magnetic flux density of the upper yoke magnetic pole part 45 is higher. When the intervening insulative film 22 is formed, and the upper yoke magnetic pole part 45 is joined to the embedded magnetic pole part 20 by way of the first and second contact areas 45a, 45b on the sides of the embedded magnetic pole part 20 closer to and farther from the ABS 30 as mentioned above, however, the occurrence of pole erasure can be suppressed even when the saturated magnetic flux density of the upper yoke magnetic pole part 45 is made higher.

Next, a coating made of alumina ($Al_2O_3$) having a thickness of 0.5 to 1.2 μm, for example, is formed so as to cover the whole upper face of the substrate, whereby an insulating part 51 is formed so as to enter the gap between the first shield part 41 and the upper yoke magnetic pole part 45 (see FIGS. 16(A) and (B)). Then, the surface of the first shield part 41 and yoke magnetic pole part 45 is subjected to CMP as a flattening process so as to yield a thickness on the order of 0.3 to 0.6 μm. Thereafter, a coating made of alumina ($Al_2O_3$) having a thickness of 0.2 to 0.3 μm, for example, is formed, and a portion to be formed with a second shield part 42 is selectively opened, whereby an insulating layer 31 is formed.

Subsequently, as shown in FIGS. 16(A) and (B), an electrode film (not depicted) made of a conductive material and a frame produced by photolithography are formed on the insulating layer 31 as shown in FIGS. 16(A) and (B), and electroplating using the electrode film is carried out, so as to form a plating layer made of Cu. This plating layer and the electrode film thereunder become the thin-film coil 100. The thin-film coil 100 is formed on the yoke magnetic pole part 45 by way of the insulating layer 31.

Next, though not depicted, a frame is formed by photolithography, and the second shield part 42 is formed by frame plating. The same magnetic material as that of the first shield part 41 is used for the second shield part 42. The thin-film coil 100 and second shield part 42 are formed by a thickness of 2.5 to 3.5 μm. A photoresist 101 is applied so as to cover the whole upper face of the substrate, and is embedded in interstices of the thin-film coil 100.

Thereafter, an alumina ($Al_2O_3$) film is formed by a thickness on the order of 3.0 to 4.0 μm on the thin-film coil 100, and then the whole surface is subjected to CMP as a surface-flattening process (see FIG. 16). Subsequently, an insulating layer made of alumina ($Al_2O_3$) is formed by a thickness of about 0.2 μm so as to cover the whole upper face of the substrate, and then an opening is provided at the portion formed with the second shield part 42. This yields an insulating layer 32 for insulating the thin-film coil 100 and a third shield part 43 from each other so that no short-circuiting occurs therebetween. Next, the third shield part 43 is formed by a thickness on the order of 2 to 2.5 μm, whereby a write shield layer 40 is formed. Thereafter, an overcoat layer 37 made of alumina is formed so as to cover the third shield part 43.

The foregoing steps yield the thin-film magnetic head structure 301 shown in FIGS. 6(A) and (B) and 7. Thus obtained thin-film magnetic head structure 301 has the above-mentioned configuration, and thus can effectively prevent the pole erasure from occurring, while improving the recording density. Cutting the thin-film magnetic head structure 301 at the ABS 30 yields the thin-film magnetic head 301A in accordance with the present invention. The thin-film magnetic head 301A exhibits operations and effects similar to those of the thin-film magnetic head structure 301.

Second Embodiment

Configuration of Thin-Film Magnetic Head Structure

Figure 17:
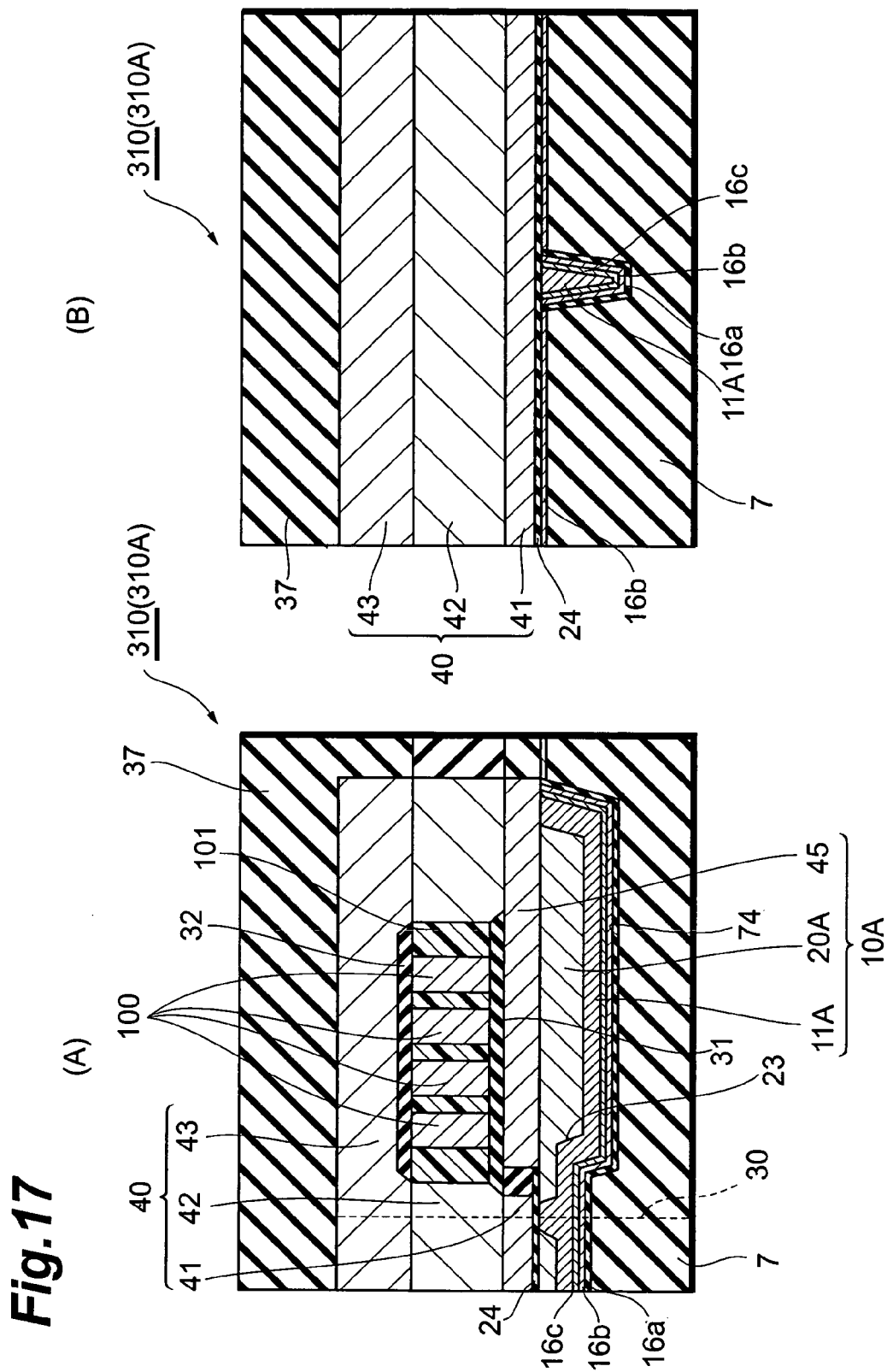
FIG. 17 is a sectional view of the thin-film magnetic head structure in accordance with a second embodiment of the present invention, in which (A) is a sectional view taken along a direction intersecting the thin-film coil, and (B) is a sectional view showing the ABS when cut at the ABS.
Figure 18:
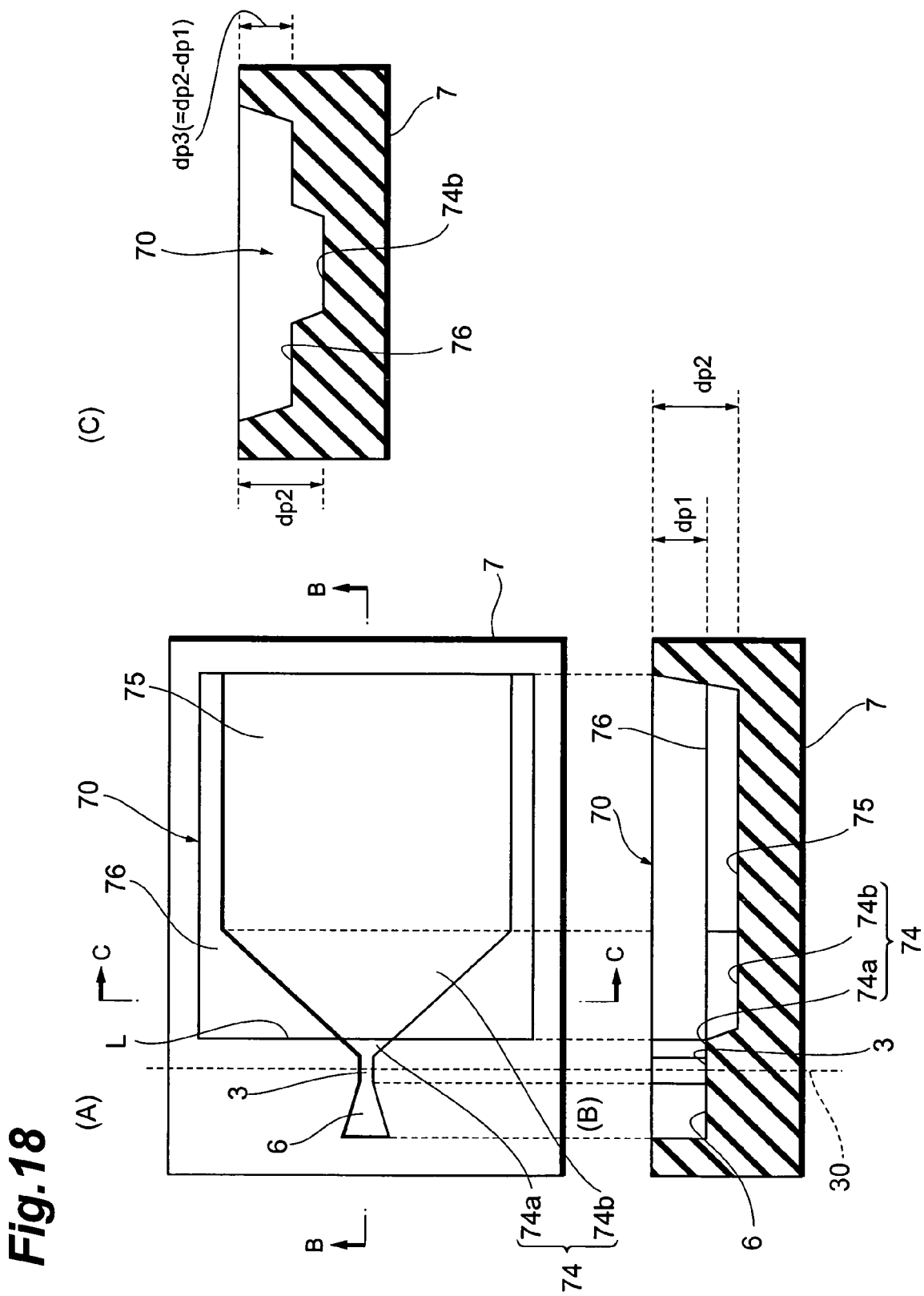
FIG. 18 is a view showing an insulating layer, in which (A) is a plan view, (B) is a sectional view taken along the line B-B in (A), and (C) is a sectional view taken along the line C-C in (A)
Figure 19:
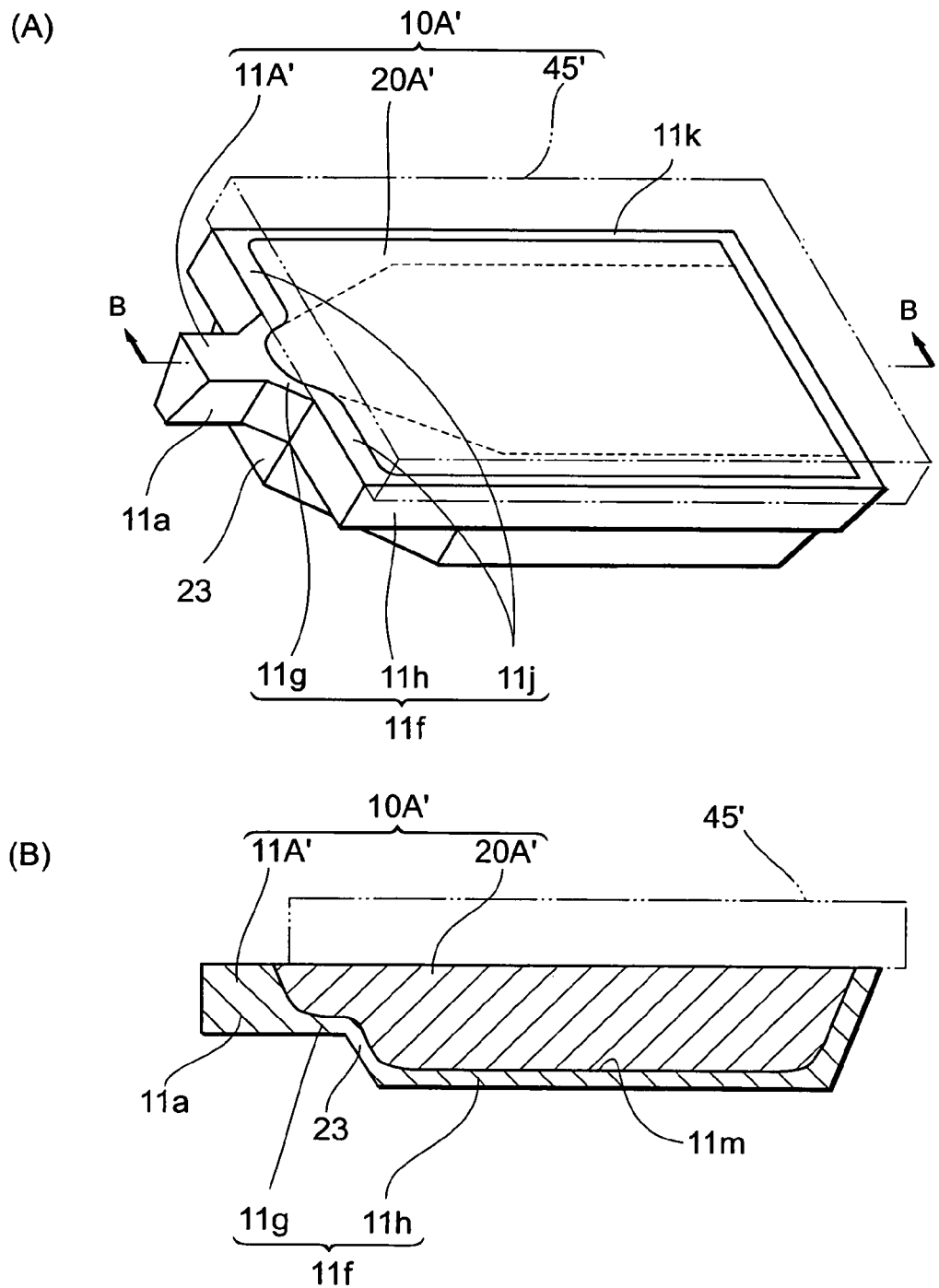
FIG. 19 is a view showing the main magnetic pole layer and upper yoke magnetic pole part after being cut along the ABS, in which (A) is a perspective view, and (B) is a sectional view taken along the line B-B of (A)
Figure 20:
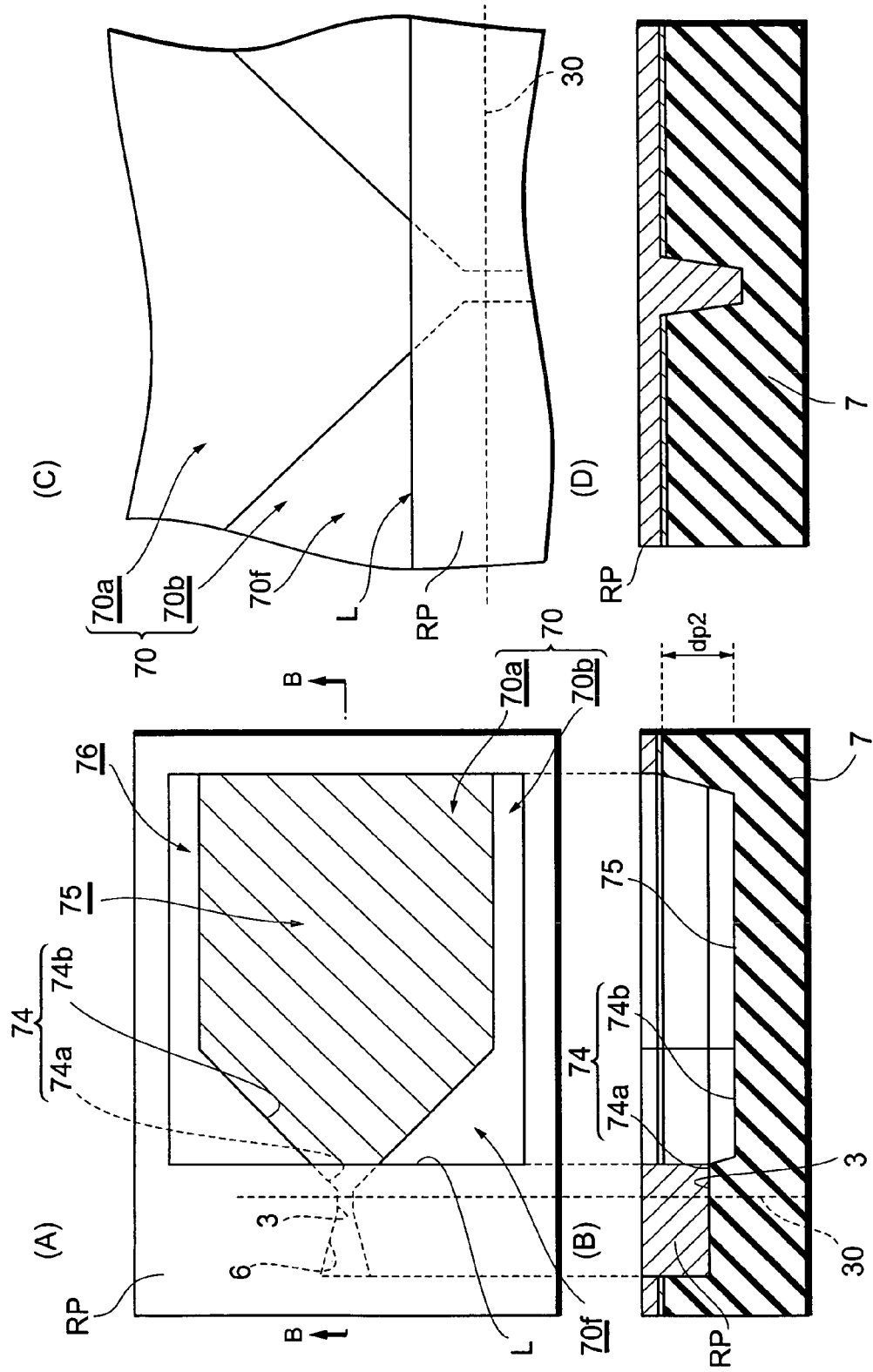
FIG. 20 is a plan view or sectional view in a step of the manufacturing method in accordance with the second embodiment, in which (A) is a plan view, (B) is a sectional view taken along the line B-B of (A), (C) is a plan view showing a major part of (A) under magnification with changed ratios of dimensions, and (D) is a sectional view taken at the ABS 30 in (B)
Figure 21:
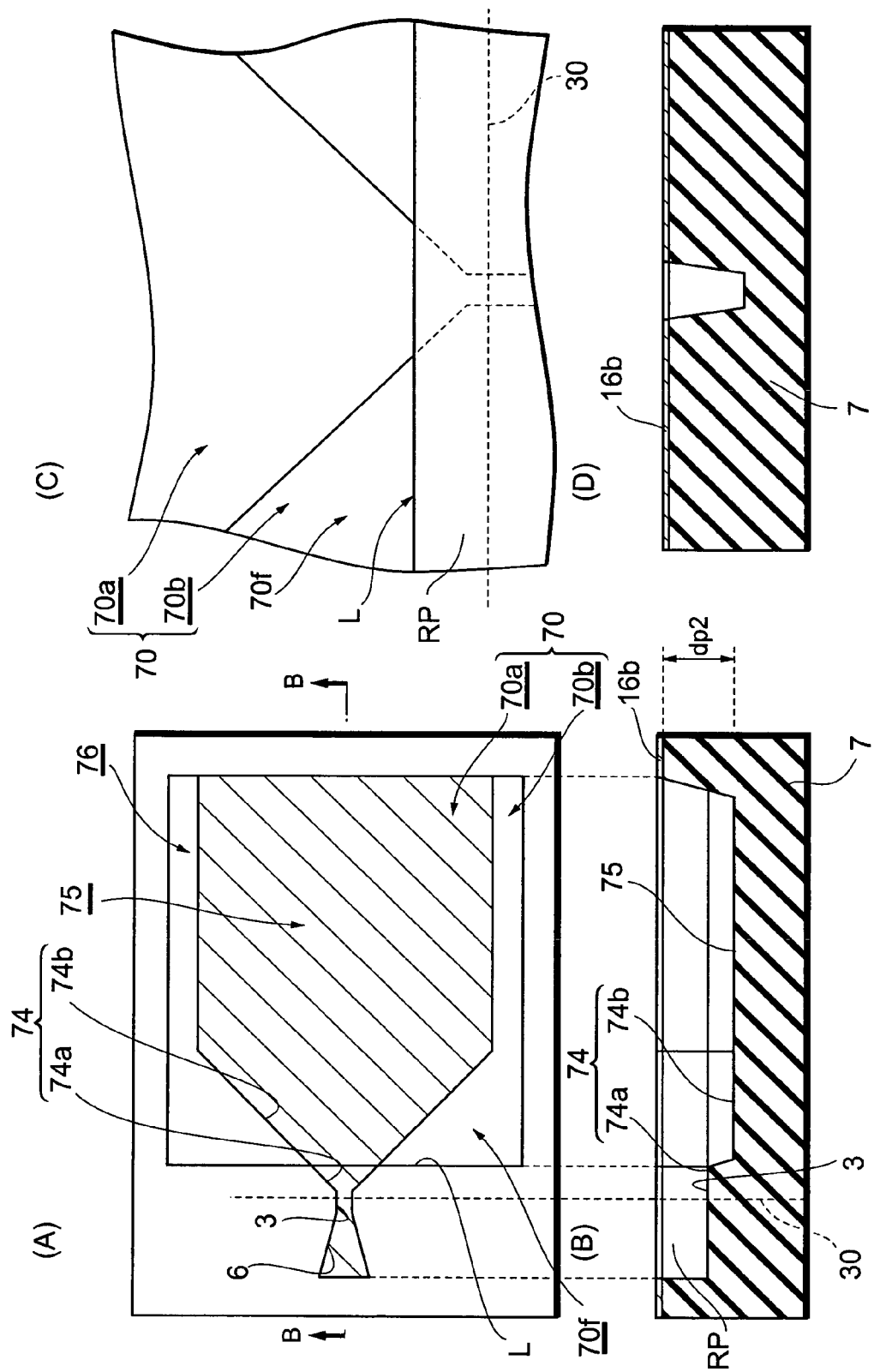
FIG. 21 is a plan view or sectional view in a step subsequent to FIG. 20, in which (A) is a plan view, (B) is a sectional view taken along the line B-B of (A), (C) is a plan view showing a major part of (A) under magnification with changed ratios of dimensions, and (D) is a sectional view taken at the ABS 30 in (B)
Figure 22:
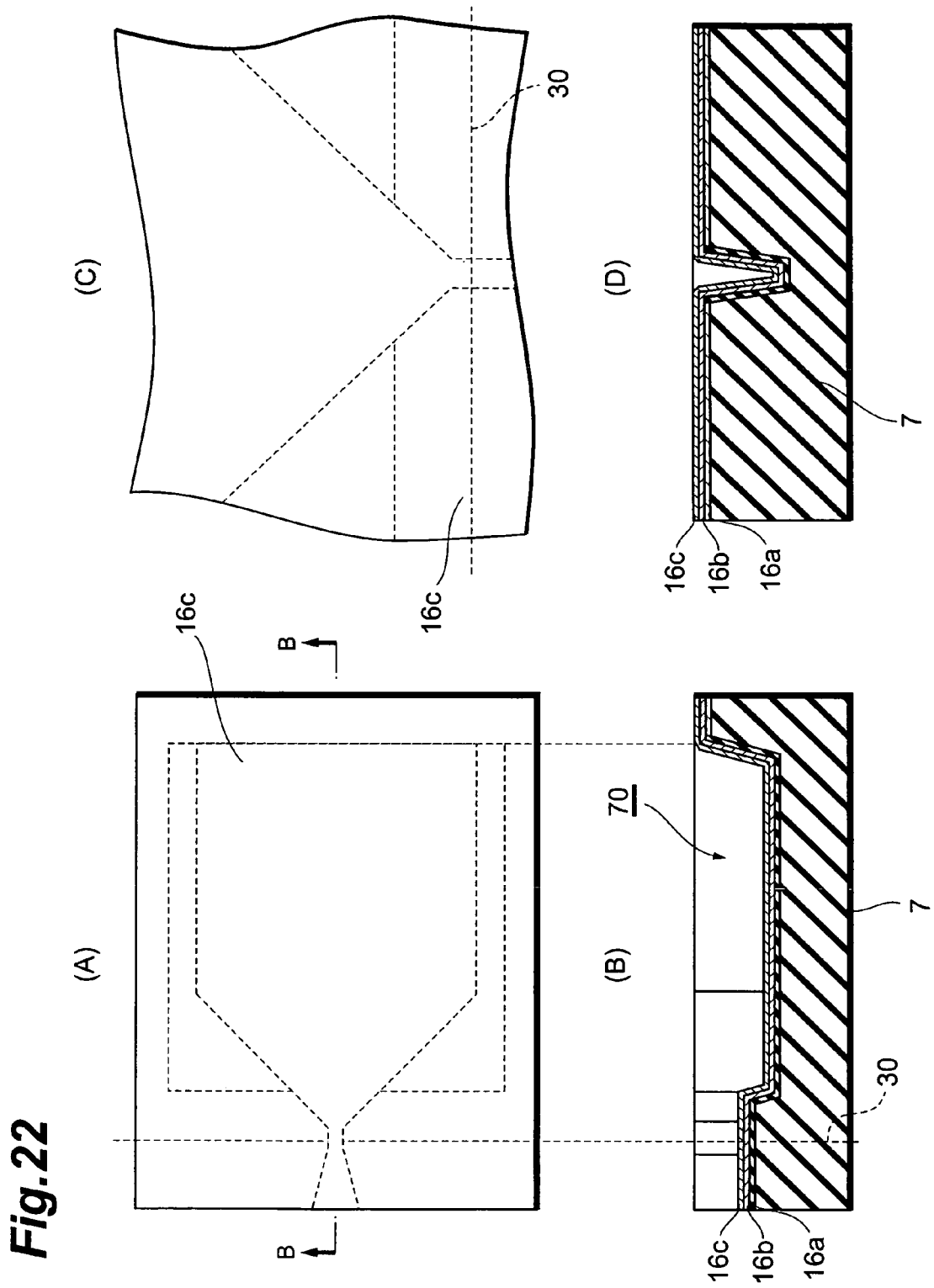
FIG. 22 is a plan view or sectional view in a step subsequent to FIG. 21, in which (A) is a plan view, (B) is a sectional view taken along the line B-B of (A), (C) is a plan view showing a major part of (A) under magnification with changed ratios of dimensions, and (D) is a sectional view taken at the ABS 30 in (B)

The thin-film magnetic head structure in accordance with a second embodiment of the present invention will now be explained with reference to FIGS. 17(A) and (B), 18(A), (B), and (C), and 19(A) and (B). FIG. 17 is a sectional view of the thin-film magnetic head structure 310 in accordance with the second embodiment of the present invention, in which (A) is a sectional view taken along a direction intersecting the thin-film coil, and (B) is a sectional view showing the ABS when cut at the ABS. FIG. 18 is a view showing a base insulating layer, in which (A) is a plan view, (B) is a sectional view taken along the line B-B in (A), and (C) is a sectional view taken along the line C-C in (A). FIG. 19 is a view showing the main magnetic pole layer 10A' after being cut along the ABS, in which (A) is a perspective view, and (B) is a sectional view taken along the line B-B of (A). In FIGS. 17, 18, and 19 (as with FIGS. 20 to 24) used for explaining the thin-film magnetic head structure 310, members and parts similar to those in the thin-film magnetic head structure 300 will be referred to with numerals identical thereto, without repeating their overlapping descriptions.

Configuration of Thin-Film Magnetic Head Structure

An insulating layer 7 is made of alumina ($Al_2O_3$) and has a cavity 70 at a center part on the surface side to be formed with a recording head. The cavity 70 is a magnetic pole forming depression in the present invention, and is sunken into a form corresponding to the outer shape of a main magnetic pole layer 10A' in order to form the main magnetic pole layer 10A' with set dimensions and form. The cavity 70, which will be explained in detail in a manufacturing method to be mentioned later, is formed prior to the main magnetic pole layer 10A' as shown in FIG. 17. The cavity 70 includes a very narrow groove part 3 and a protruded depression 6, and further includes a variable width depression 74 and fixed width depressions 75, 76. In the variable width depression 74, the part connecting with the very narrow groove part 3 includes a first area 74a having a first depth dp1 equal to that of the very narrow groove part 3 and a second area 74b, connected to the first area 74a, having a depth dp2 greater than the dp1. In the cavity 70, a stepped line L which is a boundary between the first area 74a and second area 74b, is disposed at a position distanced farther from the ABS 30 than the recording gap layer 24, thus yielding a variable depth structure whose depth changes at the stepped line L. The fixed width depression 75 has the depth of dp2. At a position distanced farther from the ABS 30 than the first area 74a, the fixed depression 76 has a fixed width broader than that of the fixed depression 75. The fixed width depression 76 has a depth of dp3 corresponding to the difference between the depths dp2 and dp1.

As shown in FIG. 19, the main magnetic pole layer 10A' (as with the main magnetic pole layer 10A before cutting) includes a base magnetic pole part 11A' and an embedded magnetic pole part 20A', and is joined to an upper yoke magnetic pole part 45'. FIG. 19 is a view showing the main magnetic pole layer 10A' after being cut along the ABS 30, in which (A) is a perspective view, and (B) is a sectional view taken along the line B-B of (A). For convenience of illustration, FIG. 19 shows the upper yoke magnetic pole part 45' by dash-double-dot lines. The main magnetic pole layer 10' is formed so as to be embedded in the cavity 70. The embedded magnetic pole part 20A' is made of a magnetic material having a saturated magnetic flux density lower than that of the base magnetic pole part 11', whereas the upper yoke magnetic pole part 45' is made of a magnetic material having a saturated magnetic flux density higher than that of the embedded magnetic pole part 20A'.

The base magnetic pole part 11' (as with the base magnetic pole part 11 before cutting) includes a magnetic pole end part 11a having a very narrow width corresponding to the very narrow groove part 3, and a yoke part 11f corresponding to the variable width depression 74 and fixed width depressions 75, 76. Since the variable width depression 74 includes the first area 74a (with the depth dp1) and second area 74b (with the depth dp2) having thicknesses different from each other as mentioned above, the yoke part 11f corresponding to the variable width depression 74 includes a first area 11g (with the depth dp1) and a second area 11h (with the depth dp2) having thicknesses different from each other. The yoke part 11f has a stepped part 23, disposed at a position distanced farther from the ABS 30 than the recording gap layer 24, as a junction between the first area 11g and second area 11h, and changes the thickness at the stepped part 23 (such that the second area 11h is thicker than the first area 11g). The yoke part 11f is formed with an expanded area 11j having a width expanded along the ABS 30 so as to correspond to the fixed width depression 76.

Leaving a peripheral area 11k corresponding to the variable width depression 74 and fixed depressions 75, 76, the inside of the yoke part 11f is a base depression 11m, in which the embedded magnetic pole part 20A' is buried. The yoke part 11f is joined to all the side and bottom faces of the embedded magnetic pole part 20 excluding the upper face. As a consequence, the main magnetic pole layer 10A' has an embedded junction structure in which the yoke part 11f excluding the magnetic pole end part 11a of the base magnetic pole part 11A' and the embedded magnetic pole part 20A' buried in the base depression 11m are joined together. Here, a magnetic material (soft material) having a saturated magnetic flux density lower than that of the magnetic material (Hi-Bs material) used in the base magnetic pole part 11A' is employed as a magnetic material constructing the embedded magnetic pole part 20A.

Other configurations and the like are in common with the thin-film magnetic head structure 300, and thus will not be explained.

When the thin-film magnetic head structure 310 having the foregoing configuration is cut at an intermediate part of the very narrow groove part 3 so as to form the ABS 30, a thin-film magnetic head 310A (see FIG. 17) is obtained.

As with the thin-film magnetic head structures 300 to 303, the thin-film magnetic head structure 310 employs a magnetic material (Hi-Bs material) having a higher saturated magnetic flux density for the base magnetic pole layer 11A in the main magnetic pole layer 10A, so as to prevent the overwrite characteristic from deteriorating, and uses a magnetic material (soft material) having a lower saturated magnetic flux density for the embedded magnetic pole part 20A, so as to lower the magnetostriction λ, thereby eliminating the pole erasure.

On the other hand, the yoke part 11f includes a second area 11h having a larger thickness on the side distanced from the ABS 30 by way of the stepped part 23 in the thin-film magnetic head 310 unlike the thin-film magnetic heads 300 to 303. As the yoke part 11f includes the second area 11h, the main magnetic pole layer 10 can enhance the quantity of magnetism by the increase in thickness from the first area 11g. As the quantity of magnetism is enhanced by the second area 11h, the overwrite characteristic is further improved.

In the thin-film magnetic head structure 310, the yoke part 11f is provided with the expanded area 11j whose width broadens along the ABS 30. The main magnetic pole layer 10 having the expanded area 11j can further enhance the quantity of magnetism in the vicinity of the ABS 30, whereby the overwrite characteristic of the thin-film magnetic head structure 310 further improves.

Method of Manufacturing Thin-Film Magnetic Head Structure

The method of manufacturing the thin-film magnetic head structure 310 differs from the method of manufacturing the thin-film magnetic head structure 300 in the steps carried out until the base magnetic pole part 11A' and embedded magnetic pole part 20A' are formed and in that it lacks the step of forming the intervening insulative film 22, whereas their subsequent steps are substantially in common. Therefore, the steps carried out until the base magnetic pole part 11A' and embedded magnetic pole part 20A' are formed will mainly be explained, whereas similar steps in the subsequent steps will be omitted or simplified.

Figure 23:
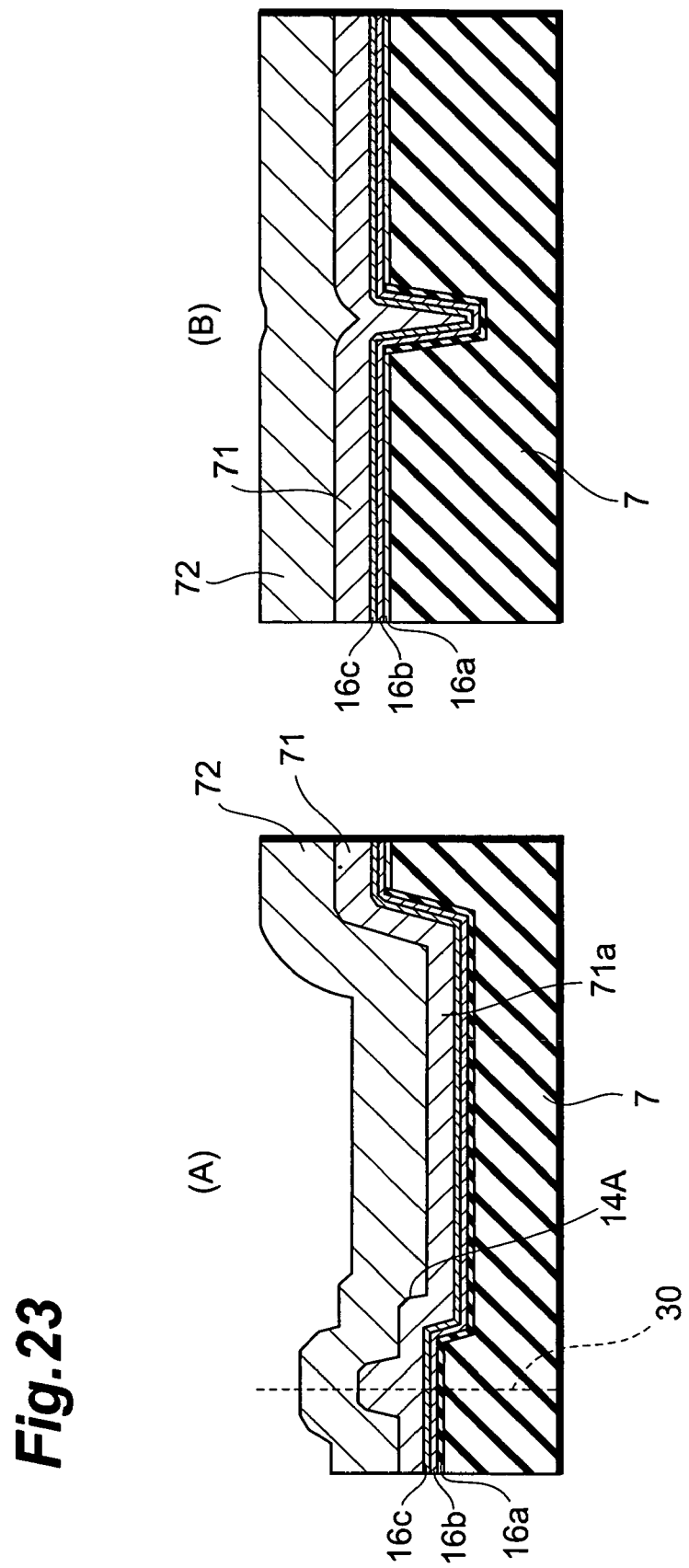
FIG. 23 is a sectional view in a step subsequent to FIG. 22, in which (A) is a sectional view corresponding to the line B-B in FIGS. 22(A), and (B) is a sectional view cut at the ABS in (A)
Figure 24:
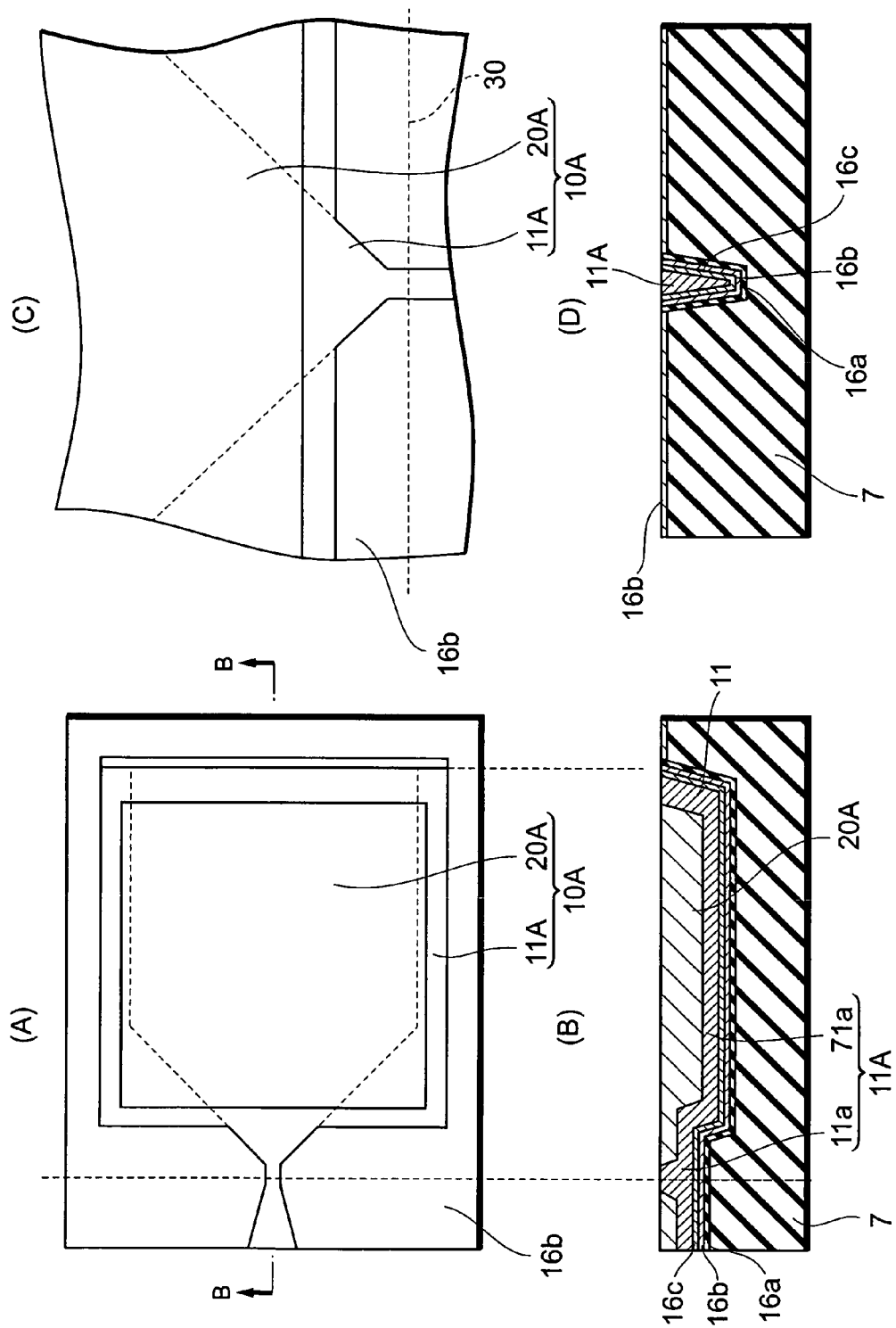
FIG. 24 is a plan view or sectional view in a step subsequent to FIG. 23, in which (A) is a plan view, (B) is a sectional view taken along the line B-B of (A), (C) is a plan view showing a major part of (A) under magnification with changed ratios of dimensions, and (D) is a sectional view taken at the ABS 30 in (B)

FIGS. 20 to 24 show plan or sectional views in respective steps of the manufacturing method, in which FIGS. 20(A) to 22(A) and 24(A) are plan views, whereas (B) is a sectional view taken along the line B-B of (A). (C) is a plan view showing a major part of (A) under magnification, whereas (D) is a sectional view taken at the ABS 30 of (B). For convenience of illustration, (C) in each drawing shows the major part of (A) under magnification with changed ratios of dimensions. In FIG. 23, (A) is a sectional view corresponding to the line B-B in FIG. 22(A), whereas (B) is a sectional view taken at the ABS 30 of (A).

The steps carried out until the insulating layer 7 is formed are in common with the steps of forming the insulating layer 7 in the thin-film magnetic head structure 301, and thus will not be explained.

After the insulating layer 7 is formed, a photoresist is applied onto the insulating layer 7 as shown in FIGS. 20(A), (B), (C), and (D), and patterning using a predetermined photomask is performed, so as to form a resist pattern exposing the surface of the insulating layer 7 into a form corresponding to a first cavity 70a. The first cavity 70a has a form in common with the above-mentioned cavity 2. Then, using the resist pattern as a mask, RIE is performed, so as to eliminate the part of insulating layer 7 not covered with the resist pattern, thereby forming the first cavity 70a such that the depth dp1 (see FIG. 18) is on the order of 0.2 to 0.4 µm. The very narrow groove part 3 of the first cavity 70a defines the track width (0.09 to 0.12 µm) and neck height NH of the thin-film magnetic head.

Thereafter, the photoresist is further applied onto the insulating layer 7, and patterning with a predetermined photomask is carried out, so as to form a resist pattern RP which exposes the surface of the insulating layer 7 into a form corresponding to the second cavity 70b. The second cavity 70b is a substantially rectangular area having one side extending along the ABS 30. This side corresponds to the above-mentioned stepped line L. For forming the second cavity 70b on the side distanced from the ABS 30 by way of the stepped line L, the resist pattern RP covers the very narrow groove part 3, the protruded depression 6, and the variable width depression (first area 74a) on the side closer to the ABS 30 in the first cavity 70a, while opening a substantially rectangular area whose width is greater than that of the first cavity 70a.

Using the resist pattern RP as a mask, RIE is performed, so as to eliminate the part of insulating layer 7 not covered with the resist pattern RP. This forms the second cavity 70b, whereas the forming of the second cavity 70b and the above-mentioned first cavity 70a yields a cavity 70 corresponding to the magnetic pole forming depression in the present invention. Here, the overlapping area (hatched part in FIG. 20(A)) between the first cavity 70a and second cavity 70b, which is constituted by the variable width depression (second area 74b) and fixed width depression 75 on the side of the stepped line L distanced farther from the ABS 30 than a recording gap layer 24 to be formed later, has been subjected to RIE twice. Consequently, a step where the depth changes occurs in the peripheral part of the overlapping area. This yields a variable depth structure in which the depth dp2 of the overlapping area is greater than the depth dp1 on the ABS 30 side as shown in FIGS. 18(A), (B), and (C).

Forming the second cavity 70b yields an expanded area 70f whose width extends along the ABS 30. The depth dp3 of the expanded area 70f is a value obtained when subtracting the depth dp1 of the first cavity 70a from the depth dp2 of the overlapping area.

Thereafter, the resist pattern RP is eliminated as shown in FIGS. 21(A), (B), (C), and (D), then an alumina film 16a is formed in order to adjust the track width as shown in FIGS. 22(A), (B), (C), and (D), and subsequently a nonmagnetic film 16b and a magnetic film 16c are formed on the whole surface of the insulating layer 7. The forming of alumina film 16a, nonmagnetic film 16b, and magnetic film 16c is in common with the method of manufacturing the thin-film magnetic head structure 301, and thus will not be explained.

Next, using CoNiFe or CoFe which is a first magnetic material having a high saturated magnetic flux density (on the order of 2.3 to 2.4 T), a plating film 71 is formed on the magnetic film 16c as shown in FIGS. 23(A) and (B). As in the method of manufacturing the thin-film magnetic head structure 301, the plating film 71 is continuously formed until the very narrow groove part 3 is filled with the plating film 71, whereby a film-like magnetic pole part 71a is formed on the inner periphery of the cavity 70 except for the very narrow groove part 3. Thus formed film-like magnetic pole part 71a has a very thin film thickness of 0.1 to 0.2 µm. Since the film-like magnetic pole part 71a is very thin, an embedded magnetic pole part 20A to be formed later is located very close to the base magnetic pole part 11A.

Thereafter, as in the method of manufacturing the thin-film magnetic head structure 301, a plating film 72 for embedding a second magnetic material different from the first magnetic material into the inside of the film-like magnetic pole part 71a is formed. Here, a magnetic material (e.g., a soft material such as FeNi having a saturated magnetic flux density of about 2.1 T or CoNiFe having a saturated magnetic flux density of about 1.9 T) whose saturated magnetic flux density is lower than that of the first magnetic material is used as the second magnetic material. Embedding the second magnetic material yields an embedded junction structure in which the film-like magnetic pole part 71a using the first magnetic material and the plating film 72 using the second magnetic material are joined together, and forms a joint surface 14A.

Subsequently, as shown in FIGS. 24(A), (B), (C), and (D), the whole surface of the substrate including the surface of the plating film 71 and the plating film 72 on the side closer to the thin-film coil 100 is subjected to chemical mechanical polishing (hereinafter referred to as "CMP") as a surface-flattening process as in the method of manufacturing the thin-film magnetic head structure 301. As a result of the surface-flattening process, the first magnetic material embedded in the very narrow groove part 3 forms a magnetic pole end part 11a, thus yielding a main magnetic pole layer 10A having an embedded junction structure in which a base magnetic pole part 11A composed of the magnetic pole end part 11a and film-like magnetic pole part 71a and the embedded magnetic pole part 20A constituted by the second magnetic material are joined together.

In the cavity 70 in which the plating film 71 and the plating film 72 are embedded, the depth dp2 (see FIG. 18) in the overlapping area between the first cavity 70a and second cavity 70b is deeper, so that the thickness of the base magnetic pole part 11A and embedded magnetic pole part 20A corresponding to the overlapping area is greater than the thickness in the other area (the thickness of the magnetic pole end part 11a in particular). Therefore, the quantity of magnetization in the base magnetic pole part 11A and embedded magnetic pole part 20A increases as the thickness is greater.

The second cavity 70b is formed with the expanded area 70f, whereby the width of the base magnetic pole part 11A and embedded magnetic pole part 20A in their portion corresponding to the expanded area 70f is broader along the ABS 30.

Thereafter, for forming a recording gap layer 24 (see FIG. 17), a coating made of an insulating material such as alumina or a nonmagnetic metal material such as Ru, NiCu, Ta, W, Cr, $Al_2O_3$, $Si_2O_3$, or NiPd is formed by 400 to 500 Å. Though this method does not include a step of forming the intervening insulative film 22 such as the one explained in the method of manufacturing the thin-film magnetic head structure 301, the step of forming the intervening insulative film 22 may be provided as in the method of manufacturing the thin-film magnetic head structure 301.

Then, a first shield part 41 (see FIG. 17) is formed so as to oppose the magnetic pole end part 11a by way of the recording gap layer 24 in order to define the neck height NH. An upper yoke magnetic pole part 45 is formed so as to join with the base magnetic pole part 11 and embedded magnetic pole part 20 at a portion not covered with the recording gap layer 24.

Subsequent steps are in common with the above-mentioned method of manufacturing the thin-film magnetic head structure 301, and thus will not be explained.

The foregoing steps yield the thin-film magnetic head structure 310 shown in FIGS. 17(A) and (B). Thus obtained thin-film magnetic head structure 310 has the above-mentioned configuration, and thus can effectively prevent the pole erasure from occurring, while improving the recording density. Cutting the thin-film magnetic head structure 310 at the ABS 30 yields the thin-film magnetic head 310A in accordance with the present invention. The thin-film magnetic head 310A also exhibits operations and effects similar to those of the thin-film magnetic head structure 310.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A thin-film magnetic head structure adapted to manufacture a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated;

wherein the main magnetic pole layer includes a base magnetic pole part comprising the magnetic pole end part and a base depression distanced farther from the medium-opposing surface than the magnetic pole end part, and an embedded magnetic pole part buried in the base depression and joined to the base magnetic pole part; and wherein the thin-film magnetic head structure includes:

a yoke magnetic pole part joined to the base magnetic pole part and embedded magnetic pole part at a position distanced farther from the medium-opposing surface than the recording gap layer, and an intervening insulative film disposed between the embedded magnetic pole part and yoke magnetic pole part at a position distanced farther from the medium-opposing surface than the recording gap layer.

2. A thin-film magnetic head structure according to claim 1, further comprising a base insulating layer including a magnetic pole forming depression sunken into a form corresponding to the main magnetic pole layer, the magnetic pole forming depression having a very narrow groove part formed so as to define a track width of the thin-film magnetic head;

wherein the base magnetic pole part is arranged at the magnetic pole forming depression in the base insulating layer.

3. A thin-film magnetic head structure according to claim 2, wherein the base magnetic pole part and the embedded magnetic pole part are joined to each other at a first contact area disposed between the medium-opposing surface and the thin-film coil, and at a second contact area disposed at a position distanced farther from the medium-opposing surface than the thin-film coil.

4. A thin-film magnetic head structure according to claim 2, wherein the base magnetic pole part has a saturated magnetic flux density set higher than that of the embedded magnetic pole part.

5. A thin-film magnetic head structure according to claim 1, wherein the base magnetic pole part has a saturated magnetic flux density set higher than that of the embedded magnetic pole part.

6. A thin-film magnetic head structure according to claim 1, wherein the base magnetic pole part and the embedded magnetic pole part are joined to each other at a first contact area disposed between the medium-opposing surface and the thin-film coil, and at a second contact area disposed at a position distanced farther from the medium-opposing surface than the thin-film coil.

7. A thin-film magnetic head structure adapted to manufacture a thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated;

wherein the main magnetic pole layer includes a base magnetic pole part comprising the magnetic pole end part and a base depression distanced farther from the medium-opposing surface than the magnetic pole end part, an embedded magnetic pole part buried in the base depression and joined to the base magnetic pole part, and a stepped part with a variable thickness at a position distanced farther from the medium-opposing surface than the recording gap layer, the thickness at a position distanced farther from the medium-opposing surface than the stepped part being formed greater than the thickness at a position closer to the medium-opposing surface than the stepped part; and wherein the thin-film magnetic head structure includes a yoke magnetic pole part joined to the base magnetic pole part and embedded magnetic pole part at a position distanced farther from the medium-opposing surface than the recording gap layer.

8. A thin-film magnetic head structure according to claim 7, further comprising a base insulating layer including a magnetic pole forming depression sunken into a form corresponding to the main magnetic pole layer, the magnetic pole forming depression having a very narrow groove part formed so as to define a track width of the thin-film magnetic head;

wherein the base magnetic pole part is arranged at the magnetic pole forming depression in the base insulating layer.

9. A thin-film magnetic head structure according to claim 8, wherein the main magnetic pole layer has an expanded area with a width expanded along the medium-opposing surface.

10. A thin-film magnetic head structure according to claim 8, wherein the magnetic pole forming depression has a variable depth structure whose depth changes at a stepped line disposed at a position distanced farther from the medium-opposing surface than the recording gap layer.

11. A thin-film magnetic head structure according to claim 8, wherein the base magnetic pole part has a saturated magnetic flux density set higher than that of the embedded magnetic pole part.

12. A thin-film magnetic head structure according to claim 7, wherein the main magnetic pole layer has an expanded area with a width expanded along the medium-opposing surface.

13. A thin-film magnetic head structure according to claim 7, wherein the magnetic pole forming depression has a variable depth structure whose depth changes at a stepped line disposed at a position distanced farther from the medium-opposing surface than the recording gap layer.

14. A thin-film magnetic head structure according to claim 7, wherein the base magnetic pole part has a saturated magnetic flux density set higher than that of the embedded magnetic pole part.

15. A thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated;
   wherein the main magnetic pole layer includes a base magnetic pole part comprising the magnetic pole end part and a base depression distanced farther from the medium-opposing surface than the magnetic pole end part, and an embedded magnetic pole part buried in the base depression and joined to the base magnetic pole part; and
   wherein the thin-film magnetic head includes:
   a yoke magnetic pole part joined to the base magnetic pole part and embedded magnetic pole part at a position distanced farther from the medium-opposing surface than the recording gap layer, and
   an intervening insulative film disposed between the embedded magnetic pole part and yoke magnetic pole part at a position distanced farther from the medium-opposing surface than the recording gap layer.

16. A thin-film magnetic head configured such that a main magnetic pole layer including a magnetic pole end part on a side of a medium-opposing surface opposing a recording medium, a write shield layer opposing the magnetic pole end part so as to form a recording gap layer on the medium-opposing surface side, and a thin-film coil wound about the write shield layer or main magnetic pole layer are laminated;
   wherein the main magnetic pole layer includes a base magnetic pole part comprising the magnetic pole end part and a base depression distanced farther from the medium-opposing surface than the magnetic pole end part, an embedded magnetic pole part buried in the base depression and joined to the base magnetic pole part, and a stepped part with a variable thickness at a position distanced farther from the medium-opposing surface than the recording gap layer, the thickness at a position distanced farther from the medium-opposing surface than the stepped part being formed greater than the thickness at a position closer to the medium-opposing surface than the stepped part; and
   wherein the thin-film magnetic head includes a yoke magnetic pole part joined to the base magnetic pole part and embedded magnetic pole part at a position distanced farther from the medium-opposing surface than the recording gap layer.

* * * * *